United States Patent [19]

Watanabe

[11] Patent Number: 5,896,211
[45] Date of Patent: Apr. 20, 1999

[54] OPTICAL COMMUNICATION SYSTEM

[75] Inventor: Shigeki Watanabe, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/959,955

[22] Filed: Oct. 24, 1997

Related U.S. Application Data

[63] Continuation of application No. 08/268,674, Jun. 30, 1994, abandoned, which is a continuation of application No. 08/173,155, Dec. 22, 1993, abandoned, which is a continuation of application No. 07/760,019, Sep. 13, 1991, abandoned.

[30] Foreign Application Priority Data

Sep. 14, 1990 [JP] Japan ................. 2-242615
Oct. 20, 1990 [JP] Japan ................. 2-282642

[51] Int. Cl.$^6$ ............................ H04J 14/02
[52] U.S. Cl. ............ 359/124; 359/133; 359/182
[58] Field of Search ................. 359/124–125, 359/132–133, 156, 162, 182, 189–192

[56] References Cited

U.S. PATENT DOCUMENTS

| | | | |
|---|---|---|---|
| 4,701,904 | 10/1987 | Darcie | 359/119 |
| 4,722,081 | 1/1988 | Fujito et al. | 359/132 |
| 4,726,644 | 2/1988 | Mathis | 350/96 |
| 4,893,300 | 1/1990 | Carlin et al. | 359/162 |
| 4,941,208 | 7/1990 | Olshansky et al. | 359/132 |
| 4,953,156 | 8/1990 | Olshansky et al. | 359/132 |
| 4,989,200 | 1/1991 | Olshansky et al. | 359/132 |
| 5,016,242 | 5/1991 | Tang | 359/124 |
| 5,020,049 | 5/1991 | Bodeep et al. | 359/124 |

FOREIGN PATENT DOCUMENTS

| | | | |
|---|---|---|---|
| 0 189 252 | 7/1986 | European Pat. Off. | |
| 0319242 | 6/1989 | European Pat. Off. | 359/132 |
| 0 386 466 | 2/1990 | European Pat. Off. | |
| 0 386 482 | 6/1990 | European Pat. Off. | |
| 0 386 482 | 9/1990 | European Pat. Off. | |
| 54-71905 | 7/1979 | Japan | |
| 56-144589 | 11/1981 | Japan | |
| 0206245 | 12/1983 | Japan | 359/124 |
| 60-90483 | 5/1985 | Japan | |
| 62-29325 | 2/1987 | Japan | |
| 62-66732 | 3/1987 | Japan | |
| 62-81136 | 4/1987 | Japan | |
| 62-116031 | 5/1987 | Japan | |
| 62-258528 | 11/1987 | Japan | |
| 64-10797 | 1/1989 | Japan | |
| 1-111389 | 4/1989 | Japan | |
| 2-36621 | 2/1990 | Japan | |
| 2-71628 | 3/1990 | Japan | |

OTHER PUBLICATIONS

Electronics Letters, vol. 24 No. 7, Mendis et al. "20 KM Single–Mode Optical Fiber System for Multichannel Video" pp. 442–443, 31st Mar. 1988.

(List continued on next page.)

*Primary Examiner*—Kinfe-Michael Negash
*Attorney, Agent, or Firm*—Staas & Halsey

[57] ABSTRACT

At a transmitting end, transmission signals corresponding to more than one channel are allocated different microwave frequencies and carriers of the microwave frequencies are modulated with the transmission signals in modulators. A filter is placed in the preceding or succeeding stage of a respective modulator to band-limit a corresponding transmission signal before or after modulation. The band-limited and modulated transmission signals are combined to produce a microwave frequency-division multiplexed signal. The multiplexed signal modulates an optical frequency modulator to produce an optical modulated signal. The optical modulated signal is transmitted to the receiving end. At the receiving end, the optical signal transmitted from the transmitting end is detected and converted to an electrical signal. The channel components are extracted from the electrical signal by bandpass filters and then demodulated.

18 Claims, 25 Drawing Sheets

OTHER PUBLICATIONS

"Subcarrier Multiplexed Lightwave System Design Considerations for Subcarrier Loop Applications" Way, W–I Journal of Lightwave Technology, vol. 7, No. 11, Nov. 1989 pp. 1806–1818.

Society of Cable TV–Engineers Meeting, Jan. 18–20, 1988.

JP 62–82735 (NL No. 8502665), Apr. 16, 1987, translation of claims.

JP–2–148929 (U.S. No. 226697), Jun. 7, 1990, translation of claims.

JP–63–70745 (Yamashita et al.), May 12, 1988, translation of claims.

Way et al.; "160 Channel FM–Video Transmission Using Optical FM/FDM and Subcarrier Multiplexing and An Erbium Doped Optical Fibre Amplifier"; Electronics Letters, vol. 26, No. 2; Jan. 18, 1990; Stevenage GB; pp. 139–142.

Vodhanel et al; "Performance of Directly Modulated DFB Lasers in 10–Gb/s ASK, FSK, and DPSK Lightwave Systems"; Journal of Lightwave Technology; vol. 8, No. 9; Sep. 1990, New York US; pp. 1379–1386.

Fibre Transmission Properties Of Optical Pulses Produced Through Direct Phase Modulation Of DFB Laser Diode—*Electronics Letters*, vol. 24, No. 8, Apr. 14 1988, pp. 486–488.

Direct Optical Characterization of DFB Lasers for CPFSK System Applications —*Electronics Letters*, vol. 25, No. 17, pp. 1108–1110, Aug. 17, 1989.

Implementation Strategy of Optical Coherent Technology Suitable for Subscriber Networks—*Globecom Tokyo*, 87, IEEE/IECE 1987, *Global Telecommunication Conference*, pp. 689–693, vol. 1.

Polarization–Insensitive Optical Coherent SCM System Using Mixed Lightwave Transmission of Signal and Local Laser Light—*Electronics Letters*, vol. 27, No. 4, Feb. 14, 1991, pp. 361–362.

Coherent Subcarrier Multiplexed Star Distribution System Using Single Local Oscillator—*Electronics Letters*, vol. 26, No. 20, Sep. 27, 1990, pp. 1680–1682.

Coherent Optical Ring Using Common Local Oscillator—*Electronics Letters*, vol. 26, No. 14, Jul. 5, 1990, pp. 1013–1015.

Video Distribution Systems Using Coherent Subcarrier Multiplexing Techniques—*EFOC/LAN 90. The Eighth European Fibre Optic Communication and Local Area Networks Exposition. EFOC Proceedings*, Munich, West Germany, Jun. 27–29, 1990, Basel, Switzerland, IGI Europe, Switzerland, pp. 334–337.

Coherent Optical FDM Broadcasting System with Optical Amplifier—*Proceedings of the Fourth Tirrenia International Workshop on digital Communications*, Tirrenia, Italy, Sep. 19–23, 1989; Elsevier Amsterdam–Oxford–New York–Tokyo.

Optical "Feedthrough" Transmission Systems for the Local Loop—*IEE Colloquium On Fibre Optic Lans and Techniques for the Local Loop (Digest No. 44)*, London, UK Mar. 17, 1989, 1989, London, UK, IEE, UK, pp. 11/1–6.

13th European Conference on Optical Communication, vol. 3, No. 13, Sep. 1987, Helsinki, "Coherent Multicarrier Techniques in Future Broadband Communication Networks", C. Bacck et al., pp. 79–87.

Patent Abstracts of Japan, vol. 013, No. 186 (E–752) May 2, 1989 & JP–A–10 10 797 (NEC Corp.) *abstract*.

Journal of Lightwave Technology, vol. 7, No. 6, Jun. 1989, New York, US; "Wide–Band Lightwave Distribution System Using Subcarrier Multiplexing", T.E. Darcie et al., pp. 997–1005.

Optical Fiber Communication Conference, vol. 1, Jan. 25, 1988, New Orleans, US; "Optical Switching Architectures", T. Yasui et al., p. THF3.

8. EFOC/LAN, Jun. 27, 1990, Munich, DE, "Video Distribution Systems Using Coherent Subcarrier Multiplexing Techniques", R. Gross et al., pp. 334–337.

Fourth Tirrenia International Workshop On Digital Communications, Sep. 19, 1989, Tirrenia, IT; "Coherent Optical FDM Broadcasting System with Optical Amplifier", K. Emura et al., pp. 205–217.

Colloquim on Fibre Optic Lans and Techniques for the Local Loop 17, Mar. 1989, London, UK; "Optical "Feedthrough " Transmission Systems for the Local Loop", A.R. Hunwicks et al., pp. 11.1–11.6.

Electronics Letters, vol. 27, No. 4, Feb. 14, 1991, Stevenage, GB; "Polarisation–Insensitive Optical Coherent SCM System Using Mixed Lightwave Transmission of Signal and Local Light", Watanabe, pp. 361–362.

Electronics Letters, vol. 26, No. 20, Sep. 27, 1990, Stevenage, GB; "Coherent Subcarrier Multiplexed Star Distribution Sysztem Using Single Local Oscillator", M.S. Kao et al., pp. 1680–1682.

Electronics Letters, vol. 26, No. 14, Jul. 5, 1990, Stevenage, GB; "Coherent Optical Ring Using Common Local Oscillator", M.S. Kao et al., pp. 1013–1015.

Electronics Letters, vol. 24, No. 8, Apr. 14, 1988, Stevenage, GB; "Fibre Transmission Properties of Optical PUlses Produced Through Direct Phase Modulation of DFB Laser Diode", Shirasaki et al., pp. 486–488.

Electronics Letters, vol. 25, No. 17, Aug. 17, 1989, Stevenage, GB; "Direct Optical Characterisation of DFB Lasers for CPFSK System Applications", Pedersen et al., pp. 1108–1110.

Globecom '87, vol. 1, Nov. 15, 1987, Tokyo, JP; "Implementation Strategy of Optical Coherent Techology Suitable for Subscriber Networks", Suyama et al., pp. 689–693.

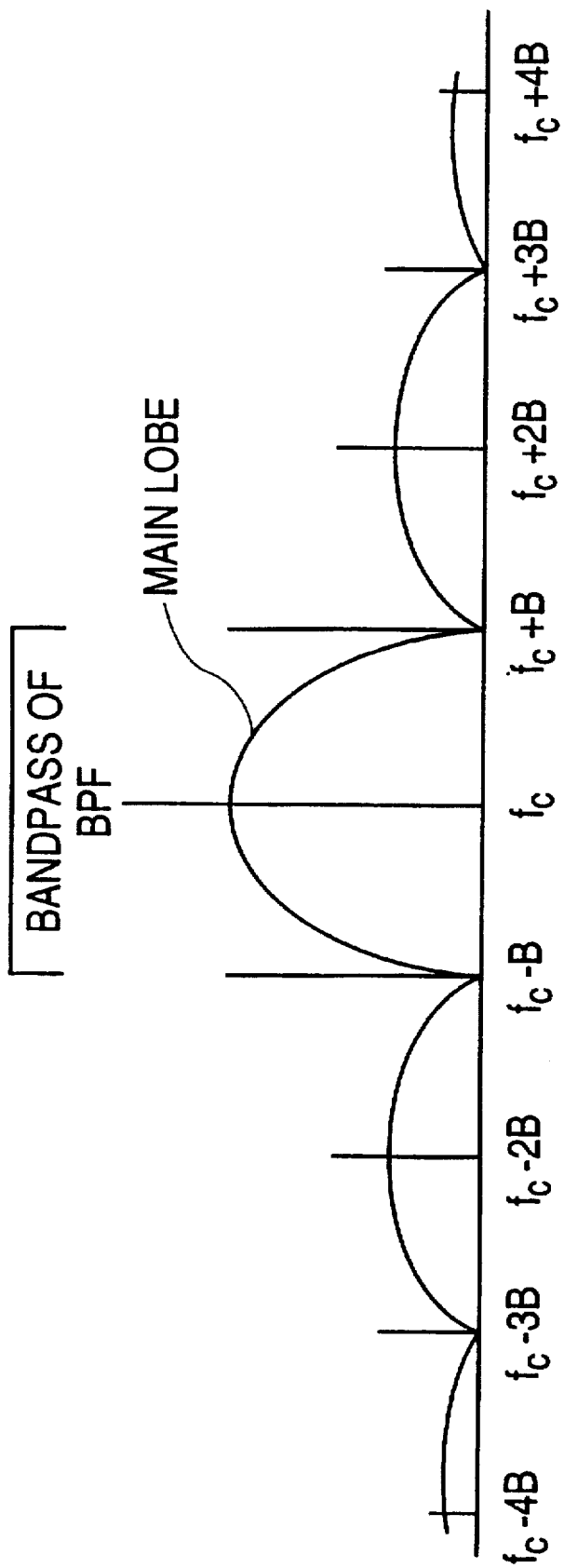

OPTICAL COMMUNICATION SYSTEM

This application is a continuation of application Ser. No. 08/268,674, filed on Jun. 30, 1994, now abandoned which is a continuation of prior application Ser. No. 08/173,155, filed on Dec. 22, 1993, now abandoned which is a continuation of prior application Ser. No. 07/760,019, filed on Sep. 13, 1991 now abandoned.

BACKGROUND OF THE INVENTION

1. Field of the Invention

The present invention relates to an optical communication system based on optical modulation using a microwave frequency-division multiplexed signal and, more particularly, to an SCM (subcarrier multiplexed) optical communication system.

The SCM optical communication system has an excellent feature in that all kinds of signals in either analog or digital form can be transmitted at the same time and in large quantities using only a single optical carrier. The present invention employs FM modulation based on direct modulation by a semiconductor laser, etc., as the optical modulation in the SCM optical communication system. The present invention can be applied to all types of information communication networks including a conventional optical communication network, an optical CATV network, a broadband distribution network mainly handling image information, and future ISDN (integrated services digital network).

2. Description of the Related Art

Heretofore, wavelength-division multiplexed transmission has been used mainly for multiplexing transmitting signals in optical communication (such as large-capacity signal multiplexed transmission, in particular). This is intended for multi-channel transmission with optical waves of different wavelengths (or frequencies) used as carriers. In the case of an intensity modulation and direct detection (IM/DM) system, the wavelength-division multiplexing transmission requires a channel spacing of the order of several nanometers in wavelength so that channels can be distinguished from each other by optical filters. In the case of a coherent optical communication system, a channel spacing is presently required which is of the order of ten and several times the bit rate because the ability to control crosstalk between adjacent channels is limited. In the case of, for example, high-speed multiplexed transmission at a bit rate in the order of gigabits, the channel spacing is about 20 GHz. A receiver which can detect all of the channels simultaneously cannot be realized. However, the number of channels to be multiplexed may be increased at the sending end. Therefore, only one channel can be received at a time.

On the other hand, the conventional SCM optical communication system uses mainly an intensity modulation system based on the direct modulation of a semiconductor laser as its optical modulation system, and a direct detection system using a PIN photodiode or APD as its receiving system.

By way of example, a conventional FDM (frequency-division multiplexed) optical transmission system and a conventional TDM (time-division multiplexed) optical transmission system are illustrated in FIG. 1 and FIG. 2, respectively. In both systems, coherent transmission of four-channel, 622 Mb/s signals is made, and the optical transmission capacity is 2.5 Gb/s.

In the optical FDM system, as can be seen from FIG. 1, optical modulators 1—1 to 1–4, which correspond in number (four in this example) to channels and have optical carriers of different frequencies fs1 to fs4, each produce a modulated optical signal. These modulated signals from the optical modulators are mixed in an optical coupler 2 to produce a frequency-division multiplexed optical signal which, in turn, is transmitted through an optical fiber 3. At the receiving end, the optical signal transmitted through the optical fiber is mixed with a local light source (semiconductor laser) and heterodyne detected by means of a local oscillator, an optical receiver 5 and an amplifier 6, whereby it is converted to an electric intermediate frequency signal. The resulting electric signal is then filtered by a bandpass filter 7 to allow only the signal on a desired channel to pass. The signal is then demodulated by a demodulator 8.

In the TDM optical transmission system, as can be seen from FIG. 2, signals transmitted on channels are time-division multiplexed by a multiplexer (MUX) 11 to produce a time-division multiplexed signal which, in turn, modulates an optical modulator 12. The modulated signal is transmitted through an optical transmission fiber 13. At the receiving end, the optical signal transmitted from the transmitting end is optical-heterodyne detected by the use of a local light source (semiconductor laser) 14, an optical receiver 15 and an amplifier 16 for conversion to an electric signal. The resulting electric signal is filtered by a bandpass filter 17 to pass intermediate frequency signals of all the channels (bandwidth is about 25 GHz×2). These signals are demodulated by a demodulator 18 and then separated by a demultiplexer (DEMUX) 19 into the signals for the respective channels.

A problem with such a conventional optical frequency-division multiplex transmission system as shown in FIG. 1 is that, since the channel spacing at the time of signal multiplexing must be large, of the order of ten and several times the bit rate, multiplexed signals cannot be detected simultaneously at the receiving end. However, the number of channels to be multiplexed may be increased at the transmitting end, but a limited number of channels that can actually be detected. In the case of high-speed transmission of digital data (gigabit transmission) in particular, only one channel can be detected at a time by a receiver. Also, the number of channels which can be multiplexed is limited by the band of frequencies over which a semiconductor laser serving as a local light source is tunable.

An optical time-division multiplex transmission system such as that shown in FIG. 2 requires a multiplexer for time-division multiplexing and a demultiplexer for separating the components in a time-division multiplexed signal transmitted over an optical transmission line. These circuits are very expensive. The use of these circuits will lead to an increase of cost of the whole system. Moreover, the heterodyne detector requires a demodulation bandwidth which is wide enough to cover all the channels that are multiplexed.

The conventional SCM optical communication system described above requires that the light output be linear with the intensity modulation of the semiconductor laser. This sets a limit to the bandwidth for modulation. Under the present circumstances, the bandwidth is in the order of 1 to 2 GHz at best. Thus, the wideband transmission is apt to be influenced by signal distortion, thus limiting the capacity of transmission information. This makes it difficult to meet the requirements of future large capacity communications. Moreover, since the direct detection system alone can be used as the detection system, it is difficult to achieve a sufficient receiver sensitivity. Therefore, there are limits to transmission distance and the number of signals to be distributed.

If, therefore, optical angular modulation could be used as the optical modulation in the SCM optical communication system, such technical problems would be solved. In this case, however, to achieve a high receiver sensitivity, the coherent optical transmission system must be used, which requires an optical heterodyne receiver or an optical homodyne receiver, which have complex structures. It also requires countermeasures against degradation of the receiver sensitivity due to fluctuations in the state of polarization of signal light and local light. This will make the receiver very expensive. It is difficult to use such an expensive receiver in subscriber systems.

SUMMARY OF THE PRESENT INVENTION

It is an object of the present invention to provide an optical communication system which permits large-capacity frequency-division multiplexed optical transmission to be implemented easily and at a low cost and a number of channels to be received simultaneously by a single receiver.

It is another object of the present invention to provide an optical communication system which permits SCM optical communication by coherent optical transmission to be implemented at a low cost.

A feature of the present invention resides in an optical communication system characterized by allocation of transmission signals to more than one channel at different microwave frequencies, providing modulators for modulating carriers of the microwave frequencies with the transmission signals and band-limiting filters placed in the preceding stages or succeeding stages of said modulators, combining band-limited and modulated transmission signals to produce a microwave frequency-division multiplexed signal, frequency modulating an optical frequency modulator with the multiplexed signal to produce an optical frequency modulated signal, optically transmitting the optical frequency modulated signal, detecting the optically transmitted optical signal to thereby convert it to an electric signal, separating the electrical signal into channels by bandpass filters and demodulating each of the signals separated into channels.

BRIEF DESCRIPTION OF THE DRAWINGS

FIG. 8 illustrates a general spectrum of a modulated signal;

DETAILED DESCRIPTION OF THE PREFERRED EMBODIMENTS

The present invention is an improvement on the conventional SCM optical communication system and its basic configurations are illustrated in FIGS. 3 to 6.

Figure 3:
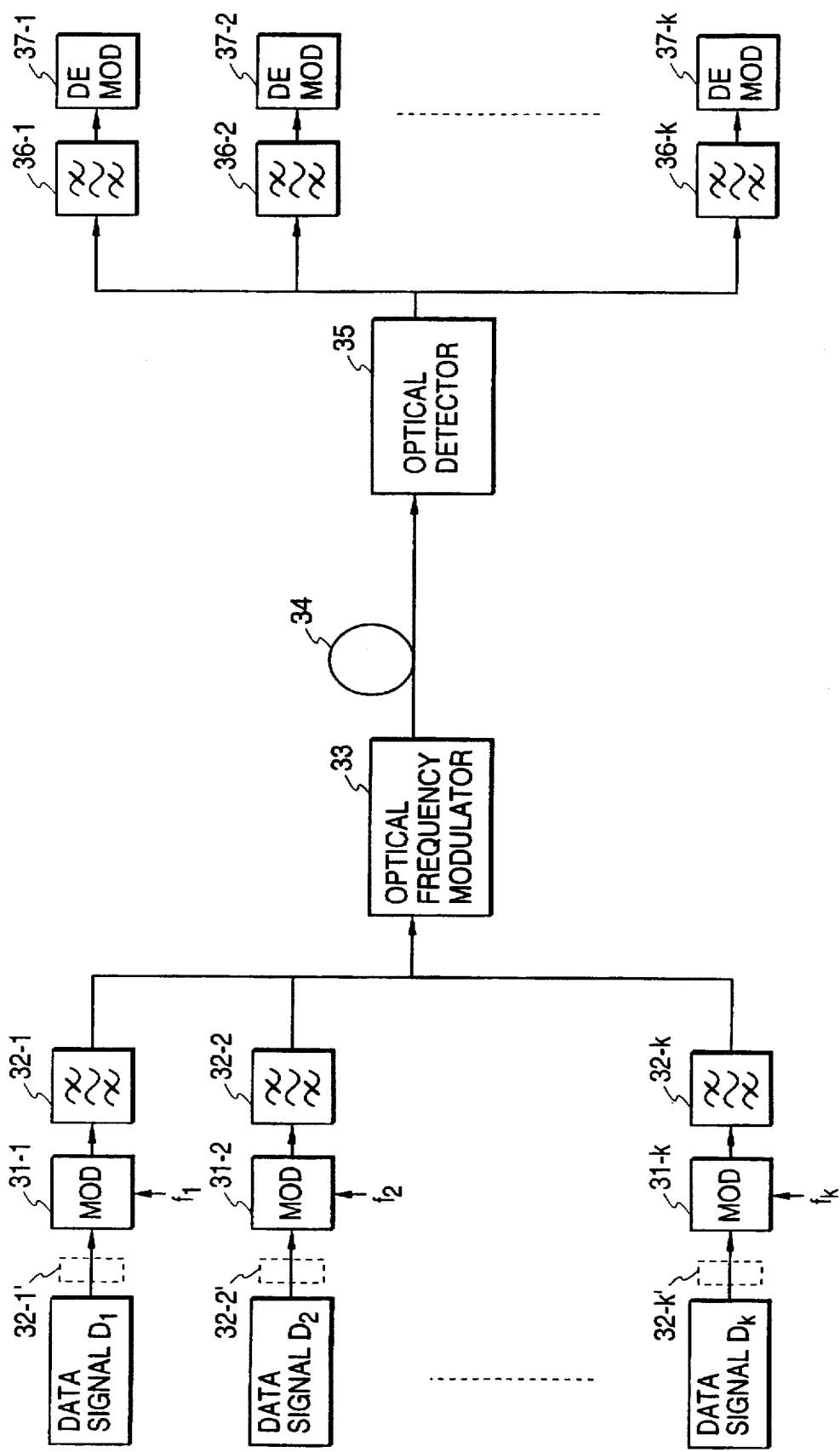
FIGS. 3 to 6 illustrate the fundamentals of optical communication systems of the present invention.

Referring first to FIG. 3, at the transmitting end, microwave carrier frequencies $f_1$ to $f_k$ are allocated to channels (the number of channels is supposed here to be k), respectively. In modulators (MOD) 31-1 to 31-k, the carriers of $f_1$ to $f_k$ are modulated with data signals $D_1$ to $D_k$ on the channels. The modulated carriers output from the modulators 31-1 to 31-k are filtered by bandpass filters 32-1 to 32-k, respectively. The output signals of the filters are added together to produce a microwave frequency-division multiplexed signal, which, in turn, frequency modulates an optical frequency modulator 33. The frequency modulated signal output from the optical frequency modulator is transmitted over an optical transmission fiber 34.

At the receiving end, the optical signal transmitted over the optical fiber is detected by an optical detector 35, whereby it is converted to an electric signal. The resulting electric signal is applied to bandpass filters 36-1 to 36-k for separation into channels. The output signals of the bandpass filters 36-1 to 36-k are demodulated by demodulators (DEMOD) 37-1 to 37-k, respectively.

Figure 4:
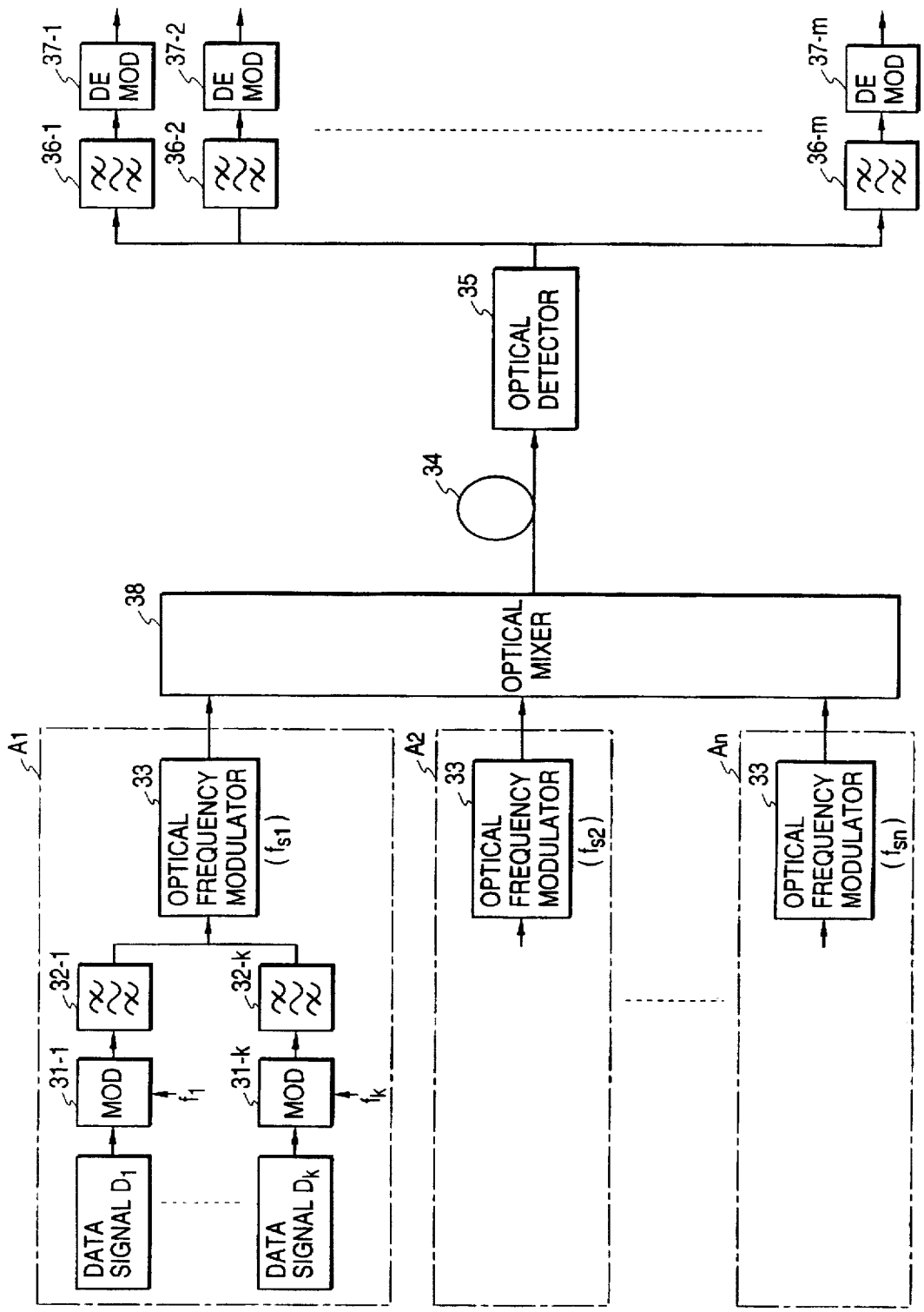

In the other system of FIG. 4, at the transmitting end, there are provided n optical frequency-modulated signal generating sections $A_1$ to $A_n$, each of which is the same in arrangement as the transmitter of FIG. 3 constructed from the modulators 31-1 to 31-k, the bandpass filters 32-1 to 32-k and the optical frequency modulator 33. However, the optical frequency modulators 33 in the optical frequency-modulated signal generating sections $A_1$ to $A_n$ have their respective optical carriers of different frequencies $f_{s1}$ to $f_{sn}$. The optical frequency-modulated signal generating sections A1 to An produce their respective optical frequency-modulated signals in the same manner as in FIG. 3. The optical frequency-modulated signals are mixed in the optical combiner or coupler 38 to produce an optical frequency-division multiplexed signal which, in turn, is transmitted over the optical transmission fiber 34.

At the receiving end, the optical frequency-division multiplexed signal is detected by the optical detector 35, whereby it is converted to an electric signal. The resulting electric signal is applied to m bandpass filters 36-1 to 36-m, which correspond in number to all the channels or part of the channels, for separation into channel components. The channel components are demodulated by demodulators 37-1 to 37-m.

In the arrangements of FIGS. 3 and 4, the modulators 31-1 to 31-k may employ any of analog and digital modulation systems which include amplitude modulation (AM), frequency modulation (FM), phase modulation (PM), intensity modulation, amplitude-shift keying (ASK), frequency-shift keying (FSK), phase-shift keying (PSK), etc. All the modulators 31-1 to 31-n are not required to employ the same modulation system, but more than one modulation system may be employed in combination.

As the optical frequency modulator 33, use may be made of a semiconductor laser (a broadband DFB type semiconductor laser, in particular). In this case, the direct modulation of its bias current permits the optical frequency modulation.

As the detection system in the optical detector 35, use may be made of an optical heterodyne or homodyne detection system using local light, a direct detection system using optical filters, a detection system using an optical frequency discriminator, etc. In the case of the direct detection system using optical filters, the electrical bandpass filters 36-1 to 36-k become unnecessary, but as many optical filters as there are channels and demodulators succeeding the respective optical filters are needed instead. In the case of the optical heterodyne detection system, by adjusting the oscillation frequency of its local light source, it becomes possible to select a channel among channels. In this case, only one set of a bandpass filter and a demodulator has to be provided to follow the optical detector 35, irrespective of the number of channels.

The optical communication system shown in FIG. 3 or FIG. 4 may be employed to implement an optical exchange system or an optical switching system. That is, the optical exchange system is implemented by inputting the demodulated signals in the optical communication system to an electronic exchange system having as many input/output ports as there are channels and performing arbitrary exchanges of channels. In addition, the optical exchange system will also be implemented by dividing the optical signal transmitted in the above-described optical communication system into as many optical signals as there are transmission channels using branch lines, optical-heterodyne detecting the separate optical signals using separate local light emitters and selecting an arbitrary optical signal from the optical signals.

Figure 5:
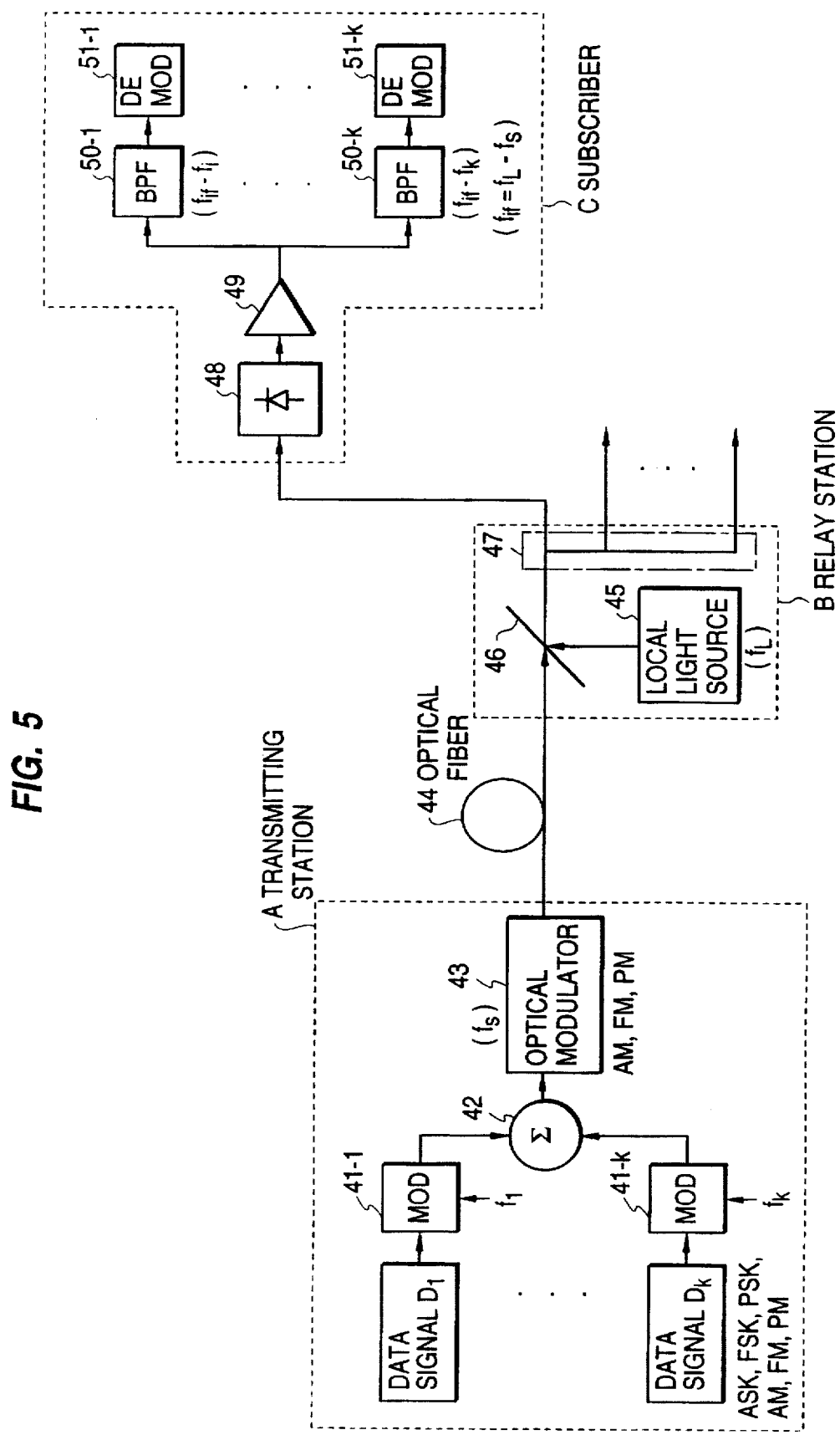

Next, FIG. 5 illustrates an application of the SCM optical communication system of the present invention to an optical distribution network. As shown in the figure, in a transmitting station A, which may be a central office or a head end, different microwave carrier frequencies $f_1$ to $f_k$ are allocated to channels (here their number is k) carrying data signals $D_1$ to $D_k$ and the carriers of frequencies $f_1$ to $f_k$ are modulated by the data signals $D_1$ to $D_k$, respectively, in modulators 41-1 to 41-k. The modulation system in this case may be any of ASK, FSK, PSK, AM, FM, PM, etc. Subsequently, the resulting modulated signals are added together in a combiner 42, such as a multiplexer, thereby producing a microwave frequency-division multiplexed signal. The multiplexed signal modulates (AM, FM, PM, etc.) an optical modulator 43. The resulting modulated optical signal (SCM optical signal) is transmitted over an optical transmission fiber 44.

The optical signal output from the transmitting station A is transmitted to each subscriber C via a repeater station B which is generally a local office, a hub, a remote terminal, etc. In the present invention, in the repeater station B, the optical signal transmitted from the transmitting station A and local light output from a local light source 45 which is common to all the subscribers C are mixed in an optical mixer 46 and the mixed signal branches off from an optical branch unit 47 to the subscriber stations C.

In each subscriber station C, the optical signal transmitted from the repeater station B is detected by an optical detector 48, whereby it is converted to an electric signal. The electric intermediate frequency signal is applied to electric bandpass filters 50-1 to 50-k via an amplifier 49, thereby separating the channel components in the optical signal. The channel components are demodulated by demodulators 51-1 to 51-k.

In the above arrangement, by transmitting a light signal obtained by coupling light signals modulated with SCM signals in the optical modulators having different carrier frequencies, wavelength (frequency of light)—division multiplex transmission of coherent SCM optical signals is made possible.

To implement a bi-directional optical transmission system, the arrangement of FIG. 5 may be modified such that a different microwave carrier frequency is allocated to each of subscribers, each carrier is modulated with a signal from a corresponding respective subscriber to produce a modulated signal, an optical modulator is modulated with the modulated signal to produce an optical modulated signal, and the optical modulated signal is, in turn, transmitted as an up signal.

Figure 6:
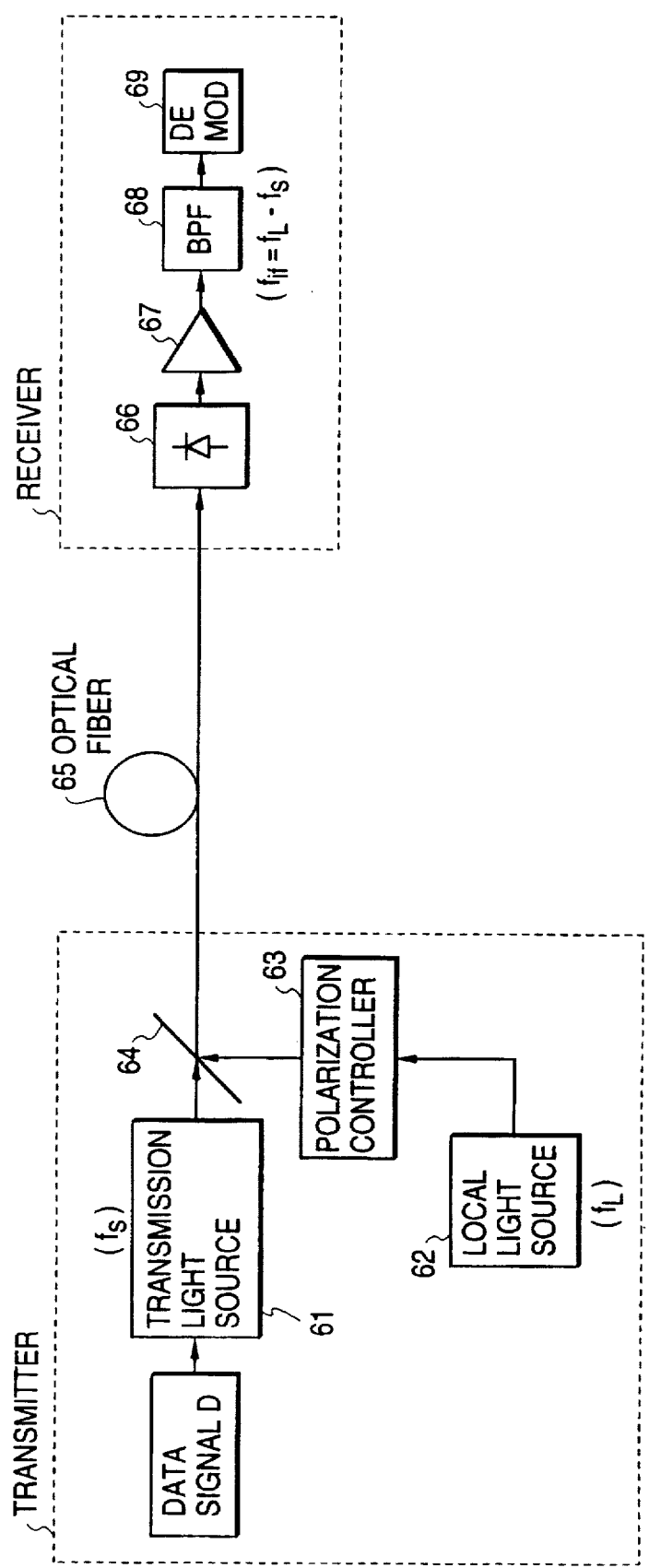

Next, FIG. 6 illustrates a coherent optical transmission system of the present invention which incorporates countermeasures against polarization fluctuation.

As shown in FIG. 6, in a transmitter T, a modulated optical signal obtained by modulating a transmission light source 61 with a data signal D and a local optical signal output from a local light source 62 are mixed in an optical mixer 64 after their polarization states have been made to coincide with each other by a polarization controller 63. The resultant mixed lightwave transmitted over an optical fiber 65.

In a receiver R, the optical signal transmitted over the optical fiber is optical-heterodyne detected by an optical receiver 66 for conversion to an electric signal. The resultant IF signal is sent via an amplifier 67, an electric filter 68, etc., to a demodulator 69.

This arrangement, which uses an optical heterodyne detection system, may also be modified to use an optical homodyne detection system by making a transmission optical signal and a local optical signal coincident with each other in their frequency and phase.

The arrangement of FIG. 6 may be modified to permit coherent wavelength (frequency of light)—division multiplexed transmission by transmitting light subjected to wavelength synthesis after polarization synthesis to a plurality of transmission light sources having different oscillation wavelengths.

The arrangement of FIG. 6 may be applied to such an SCM optical communication system as shown in FIG. 5. Moreover, it may be applied to a wavelength-division multiplex transmission system for coherent SCM optical signals.

In the arrangements of FIGS. 5 and 6, as the modulation system use may be made any of analog and digital modulation systems which include amplitude modulation (AM), frequency modulation (FM), phase modulation (PM), intensity modulation, amplitude-shift keying (ASK), frequency-shift keying (FSK), phase-shift keying (PSK), etc. All the modulators need not employ the same modulation system, but more than one modulation system may be employed in combination.

As the optical modulator, use may be made of a semiconductor laser (a broadband DFB type semiconductor laser, in particular), an LiNbO$_3$ optical modulator, etc. In the case of the coherent optical system in particular, as the modulation system, use may be made of any of coherent modulation systems such as amplitude modulation (AM), frequency modulation (FM), phase modulation (PM), etc.

In addition, as the optical receiver, use may be made of an optical heterodyne or homodyne receiver or a receiver using optical filters.

Figure 7A:
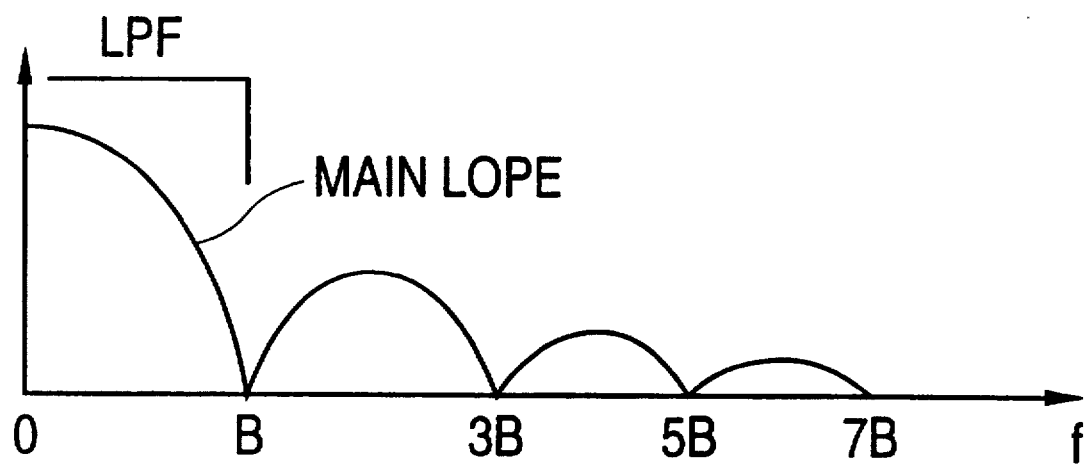
FIGS. 7A to 7C illustrate the channel allocation in the optical communication systems of the present invention.
Figure 7B:
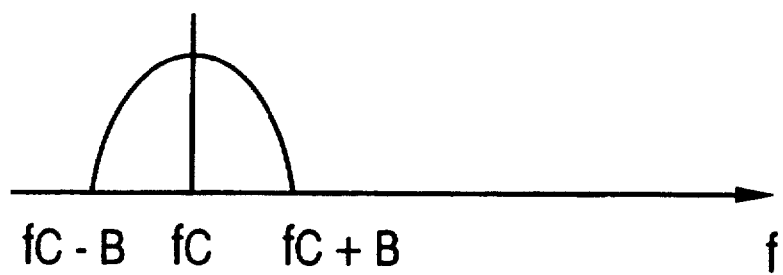
Figure 7C:
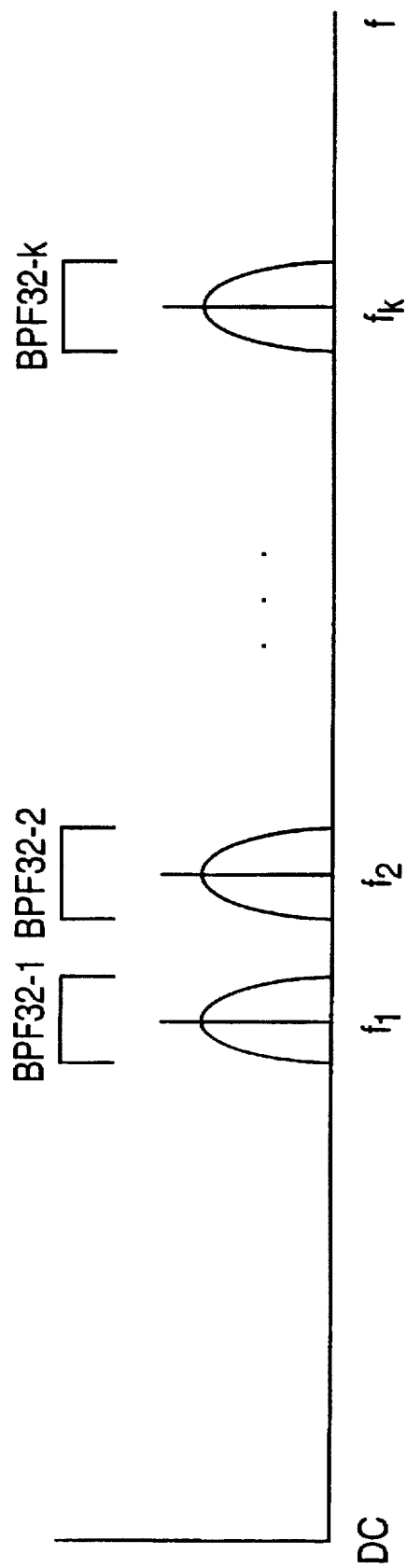

In the arrangements of FIGS. 3 and 4, carriers of different frequencies $f_1$ to $f_k$ allocated to the respective channels are modulated with data signals $D_1$ to $D_k$, respectively, and the resultant modulated signals are made to pass through bandpass filters 32-1 to 32-k and then combined (frequency-division multiplexed). The spectrum of the data signal and the frequency allocation to channels in the present case are illustrated in FIGS. 7A to 7C. Here, the channel spacing and the bandwidth of each of the bandpass filters are selected to avoid crosstalk between adjacent channels.

In general, the spectrum of a modulated signal has a shape such as that shown in FIG. 8 which has high-order Bessel function components centered at multiples of the frequency of a data signal around the carrier frequency. The spectrum of FIG. 8 corresponds to the case where a carrier having a frequency of $f_c$ is modulated with a frequency B. Thus, the bandwidth of each bandpass filter is selected to reject components which overlap the bandwidth of an adjacent channel. In practice, in order to increase the number of channels, it is desired that bandpass filters each having as narrow a bandwidth as possible be used. For example, in the case of FIG. 8, it is common to pass a component ranging from $f_c-B$ to $f_c+B$, the so-called main lobe component. Therefore, the frequency range from $f_c-B$ to $f_c+B$ may be selected as the bandwidth of the bandpass filter. The channel spacing in the frequency-division multiplexed signal obtained by synthesizing signals which passed through the bandpass filters 32-1 to 32-k can be put close up to twice the bit rate in the case of a digital signal. Therefore, it becomes possible to easily produce a high-density frequency-division multiplexed signal.

In the above, a description was made of the method by which a modulated signal on each channel was subjected to bandpass filtering. Instead, use may also be made of a method by which an original data signal is subjected to lowpass filtering before modulation.

That is, a data signal (a baseband signal), if it is a digital signal at a bit rate B, has such a Bessel-function-like spectrum as shown in FIG. 7A. Thus, by extracting only the main lobe component (0<f<B) by the use of a lowpass filter and then modulating a carrier with the main lobe component, a modulated signal which is the same as that when bandpass filtering is used will be obtained as shown in FIG. 7b.

If such modulated signals are added together, then such a SCM signal as shown in FIG. 7c will be obtained.

According to the present invention, as described above, a frequency-division multiplexed signal is produced by electric stages and then an optical carrier signal is frequency modulated with the frequency-division multiplexed signal in the optical frequency modulator 33, whereby an optical modulated signal is produced. Hence, only one optical modulator suffices.

Since, as described above, the channel spacing can be set narrow, about twice the bit rate at the transmitting end, a wideband receiver can be used at the receiving end for receiving all the channels or more than one channel at a time, permitting a considerable increase in the number of channels that can be received.

Moreover, according to the present invention, the frequency-division multiplexing can be implemented by the use of an inexpensive multiplexer such as a microwave combiner or coupler. That is, there is no need for an expensive multiplexer required of time-division multiplexing. This enables optical communication systems to be constructed at a very low cost.

Next, in the arrangement of FIG. 5, carriers of frequencies $f_1$ to $f_k$ allocated to channels are modulated with data signals $D_1$ to $D_k$, respectively, and then synthesized (frequency-division multiplexed). The frequency allocation to channels in the frequency-division multiplexed signal in this case will also be shown as in FIGS. 7A to 7C. The channel spacing needs to be selected to avoid crosstalk between adjacent channels. However, by lowpass filtering only the main lobe component of a data signal (baseband signal) or by bandpass filtering only the main lobe component after modulation, it becomes possible to put the channel spacing close to about twice the data rate in the case where digital signals are handled.

Figure 9:
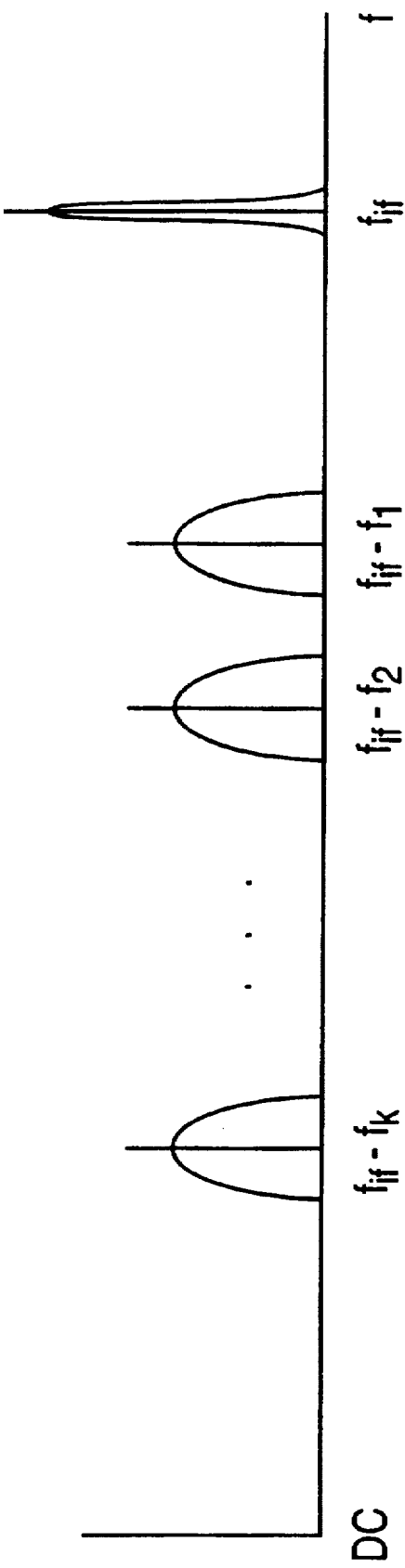
FIG. 9 illustrates frequency allocation at the IF stage of an SCM optical heterodyne detection system of the present invention.

Next, the optical modulator 43 is subjected to modulation with the multiplexed signal and then an optical modulated signal is transmitted optically. The modulated light is mixed with local light common to subscribers in the repeater station B and then branches to each subscriber. Subsequently, the modulated light is heterodyne detected by the optical receiver 48 in each subscriber's station. The resultant IF signals are separated for each of channels and then demodulated. For information, in FIG. 9 there is shown an example of frequency allocation at IF stage in the case where frequency modulation (FM) is produced in the optical modulator 43.

In the case of usual optical heterodyne detection, in order to make the power input to an optical receiver as large as possible, the local light source is generally placed in the neighborhood of the optical receiver. In an optical subscriber system, however, the distance between a repeater station B and a subscriber C is no more than several kilometers. A loss caused by optical transmission over the distance is in the order of 1 dB (in the case where a single mode fiber is used). Thus, as in the present invention, the local light source 45 can be placed in the repeater station B to permit parallel transmission to subscribers C by the use of direct fiber branching. In order to suppress the deterioration of receiver sensitivity to the utmost, it is only required that the branching loss be compensated for by an optical amplifier.

According to the present invention, as described above, a single local light source 45 placed in the repeater station B permits simultaneous optical heterodyne reception by more than one subscriber C. Therefore, cost per subscriber is reduced considerably and a low-cost coherent optical SCM network is implemented.

Moreover, since, as described above, the channel spacing can be narrowed up to about twice the data signal rate at the transmitting end, the receiving end is allowed to use a wideband receiver for simultaneous reception of all the channels or more than one channel. This permits a marked increase in the number of channels which can be received.

This possess a great advantage over the wavelength-division multiplex transmission in the conventional coherent optical communication system in which there is a limit to the number of channels that can be received at one time.

Next, in the arrangement of FIG. 6, the local light source 62 is placed in the transmitting station T, transmission light and local light are mixed after their polarization states have been made coincident with each other and the resultant IF signal is transmitted optically. Thus, the countermeasures against polarization fluctuation can be taken without imposing a burden of cost on the receiver R. In other words, stable reception is allowed without depending on the polarization state of transmission light.

In the case of usual optical heterodyne detection, in order to make the power input to an optical receiver as large as possible, the local light source is generally placed in the neighborhood of the optical receiver as described above. In an optical subscriber system, however, the distance between a transmitting station and a subscriber is relatively short and the loss of the local light is not large. Thus, the arrangement of FIG. 6 is possible.

Where the present invention is applied to an optical distribution system, the arrangement of FIG. 5 is suitable when the transmitting station is relatively distant from subscribers because it is desired that the local light source and the optical receiver be placed as close to each other as possible in terms of optical loss as described above. On the other hand, where subscribers are relatively close to the transmitting station, the use of the arrangement of FIG. 6 is suitable.

Hereinafter, preferred embodiments of the present invention will be described with reference to the drawings.

Figure 10:
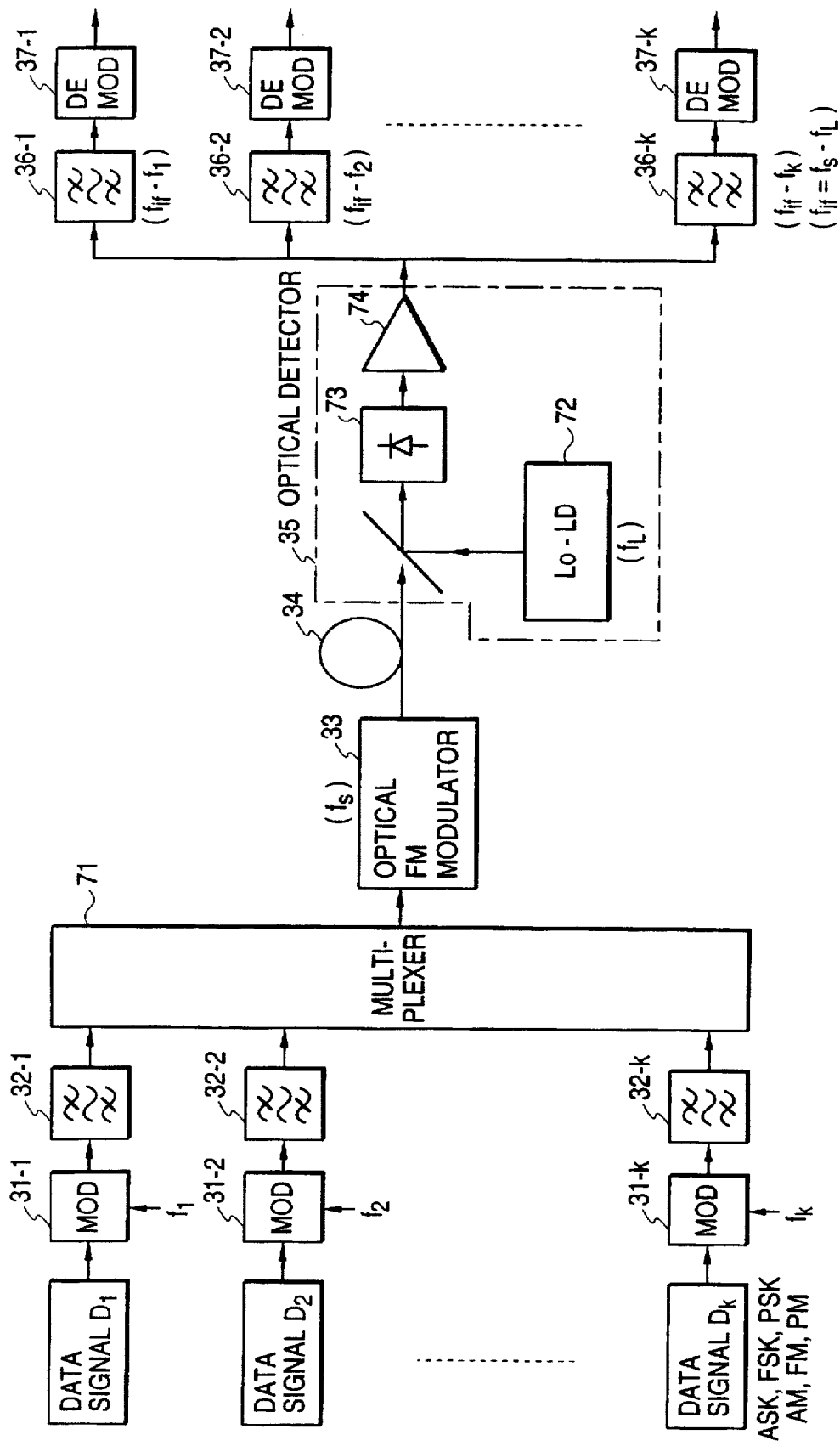
FIG. 10 is a block diagram of an optical communication system according to a first embodiment of the present invention.

FIG. 10 is a block diagram of a first embodiment of an optical communication system according to the present invention. This embodiment uses an optical heterodyne detection system as the detection system at the receiving end.

At the transmitting end, carriers of frequencies $f_1$ to $f_k$ allocated to channels are modulated with data signals $D_1$ to $D_k$ in modulators 31-1 to 31-k, respectively. The resultant modulated signals are filtered by bandpass filters 32-1 to 32-k. Here, as the modulation system used in the modulators, use may be made of any of frequency modulation (FM), amplitude modulation (AM), phase modulation (PM), intensity modulation, amplitude-shift keying (ASK), frequency-shift keying (FSK), phase-shift keying (PSK), etc. Depending on transmission signals, the modulation system may vary between channels. The channel spacing and the bandwidth of each of the bandpass filters are selected to avoid crosstalk between adjacent channels in the multiplexed signal as shown in FIGS. 7C and 8. In particular, each of the bandpass filters is designed to have a narrow bandwidth of $f_c-B$ to $f_c+B$.

Instead of using the bandpass filters, lowpass filters may be used to filter original data signals prior to modulation.

Subsequently, the signals allowed to pass through the bandpass filters are synthesized in a multiplexer 71 to produce a frequency-division multiplexed signal. The multiplexer has only to have a function of merely adding electrical signals together. For example, use may be made of a simple and inexpensive device such as a microwave coupler. The resultant multiplexed signal is used to frequency-modulate an optical frequency modulator 33, thereby producing modulated light. The modulated light is transmitted over an optical transmission fiber 34. A semiconductor laser is used as the optical frequency modulator 33. The direct modulation of a bias current of the laser will produce frequency modulation.

Next, at the receiving end, an optical heterodyne detector 35 comprises a local light source (semiconductor laser) 72, an optical receiver 73 and an amplifier 74, whereby the light signal transmitted from the transmitting end is optically heterodyned. The frequency allocation at the IF stage after the optical heterodyne detection is the same as in FIG. 9. An electrical signal resulting from the heterodyne detection branches to channels and is then filtered by bandpass filters 36-1 to 36-k, thereby deriving corresponding respective channel signals. The channel signals are demodulated by demodulators 37-1 to 37-k.

The present invention is compatible with coherent detection, such as optical heterodyne detection, as compared with the conventional SCM-AM (IM) modulation system, and the optical heterodyne detection is permitted as in the present embodiment. Thus, not only can a high receiver sensitivity be achieved easily, but all of the channels falling within the bandwidth of the optical receiver 73 can be received simultaneously. This possesses a great advantage over the optical frequency-division multiplex transmission in the conventional coherent optical communication system in which the number of channels that can be received at a time is limited to one. Therefore, not only can the transmission distance be increased, but also the number of channels that can be received can be increased considerably.

Figure 11:
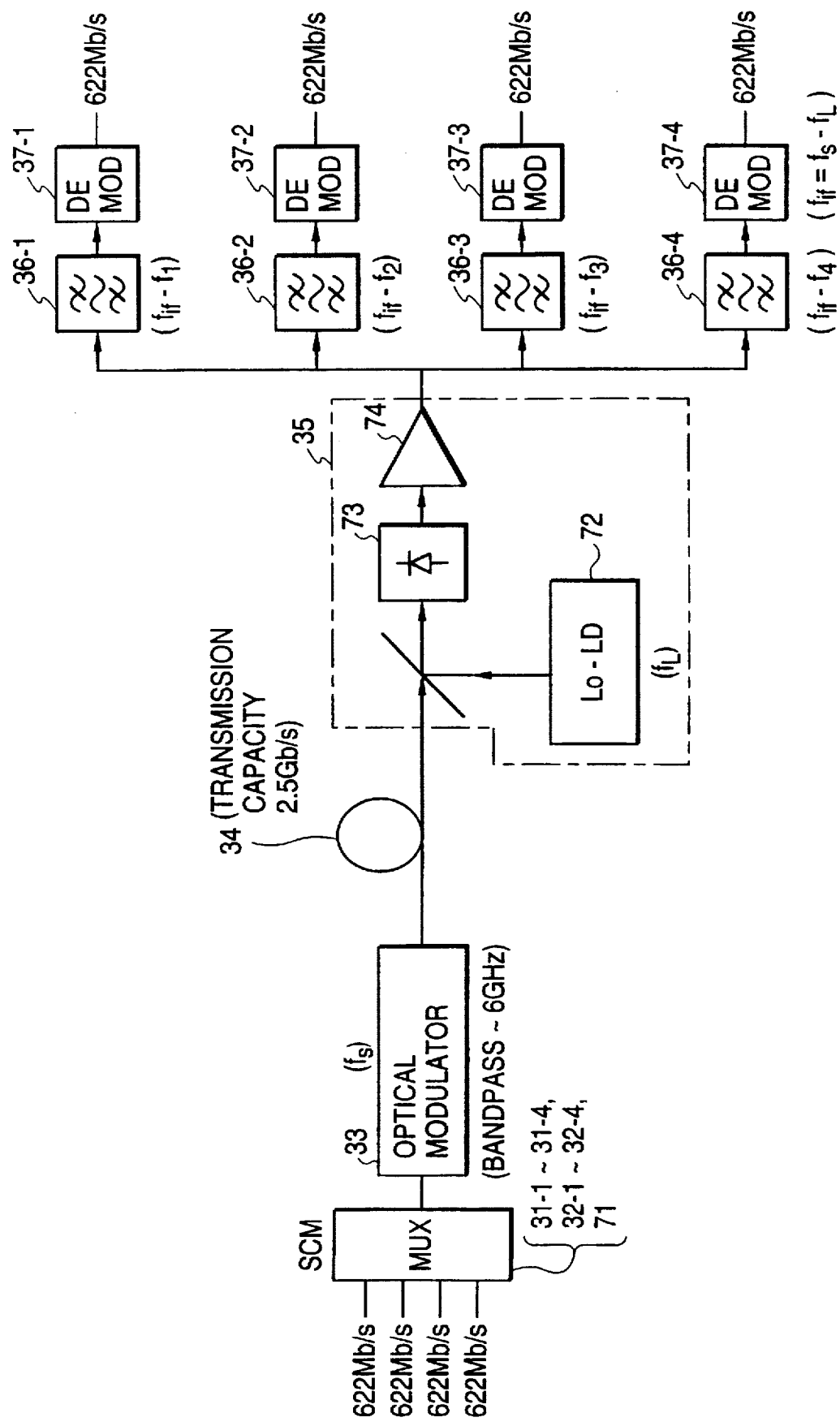
FIG. 11 illustrates a specific arrangement for four-channel 622-Mb/s signal transmission according to the first embodiment.

Here, to make the function and effect of the present embodiment definite, a comparison will be made between four-channel 622-Mb/s signal transmission shown in FIG. 11 and the conventional coherent transmission shown in FIGS. 1 and 2. In both cases, each of the number of channels, the bit rate and the optical transmission capacity (2.5 Gb/S) is the same.

Figure 1:
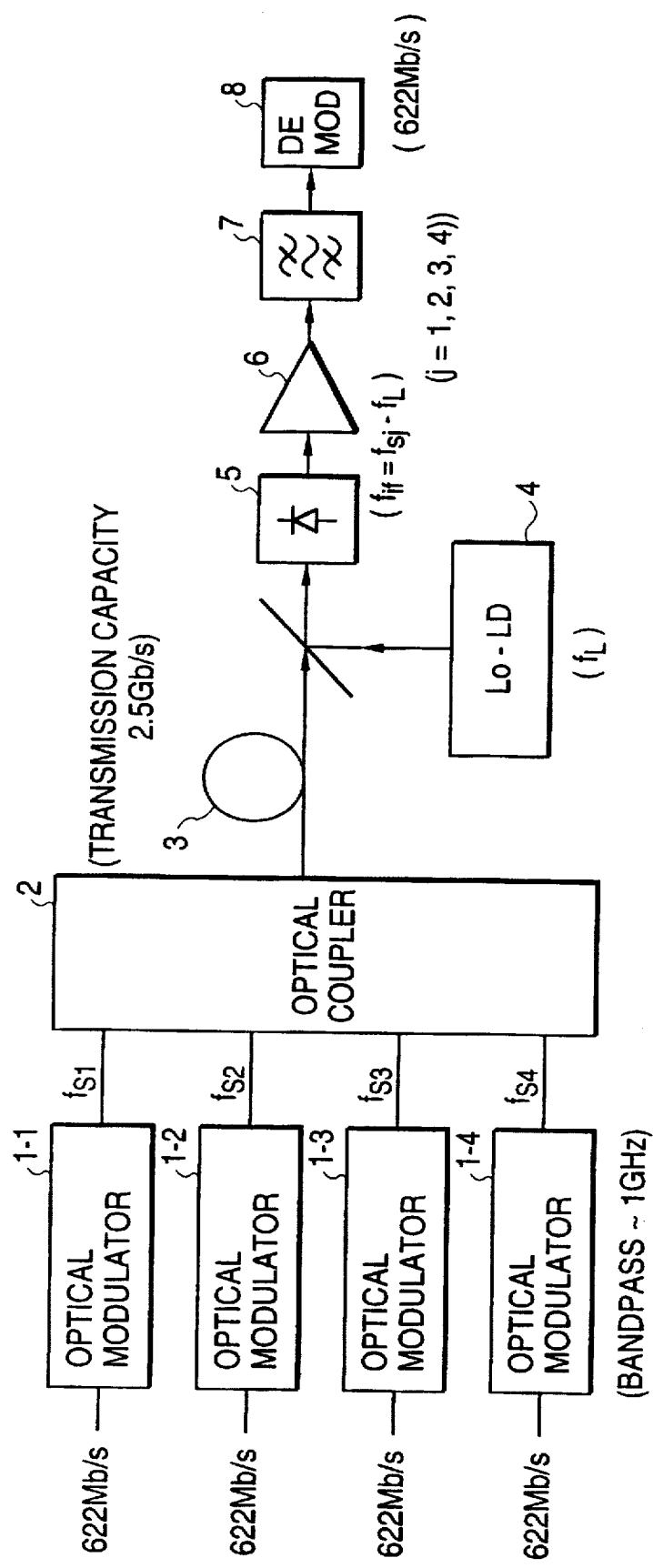
FIG. 1 is a block diagram of a conventional optical FDM system for transmission of four-channel 622-Mb/s signals.
Figure 2:
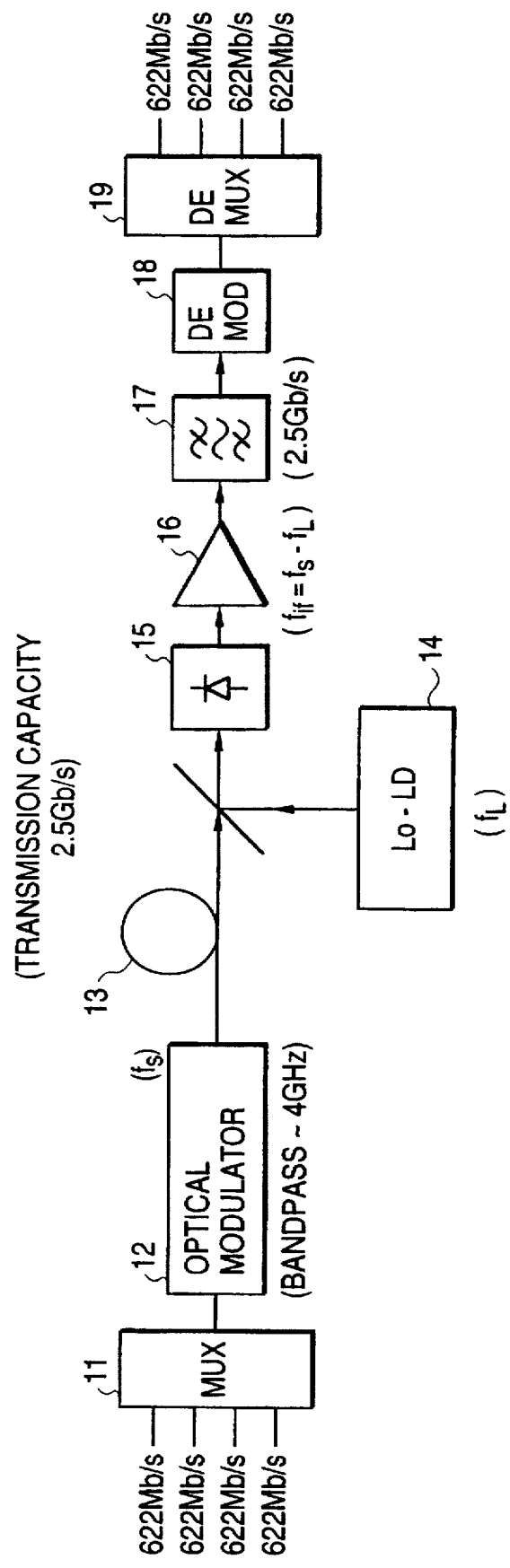
FIG. 2 is a block diagram of a conventional optical TDM system for transmission of four-channel 622-Mb/s signals.

In the first place, comparing the present embodiment with the optical FDM system of FIG. 1, in order to transmit 2.5-Gb/s information, the present embodiment needs only one optical modulator, while the optical FDM system needs as many optical modulators as there are channels. However, the present embodiment needs an optical modulator with a wider frequency response characteristic. That is in the order of 6–8 GHz, which may be achieved for example by a multielectrode DFB type semiconductor laser. Therefore, the present embodiment has a great advantage that transmission can be made by using one optical modulator.

In addition, in the present embodiment, the channel spacing at the transmitting end can be as small as approximately twice the bit rate, as described above. Therefore, the use of a wideband (approximately 10 GHz) receiver permits simultaneous reception of all of channels or more than one channel. Of course, as in the optical FDM system, the selective reception of only one channel is also possible.

Next, making a comparison between the present embodiment and the TDM optical transmission system, the present embodiment can implement frequency-division multiplexing with a multiplexer such as a microwave coupler, while the TDM optical transmission system needs an expensive multiplexer for time-division multiplexing. Moreover, as the demodulation bandwidth of the optical heterodyne detector, the present embodiment needs only the bandwidth required of each channel, while the TDM optical transmission system needs a bandwidth which is wider than that required of each channel by a factor of the number of channels. In addition, an expensive demultiplexer is required to separate the channels.

As can be seen from the foregoing, compared with the conventional multiplexing optical transmission system, the present embodiment permits a very simple, inexpensive, large-capacity optical transmission system.

Figure 12:
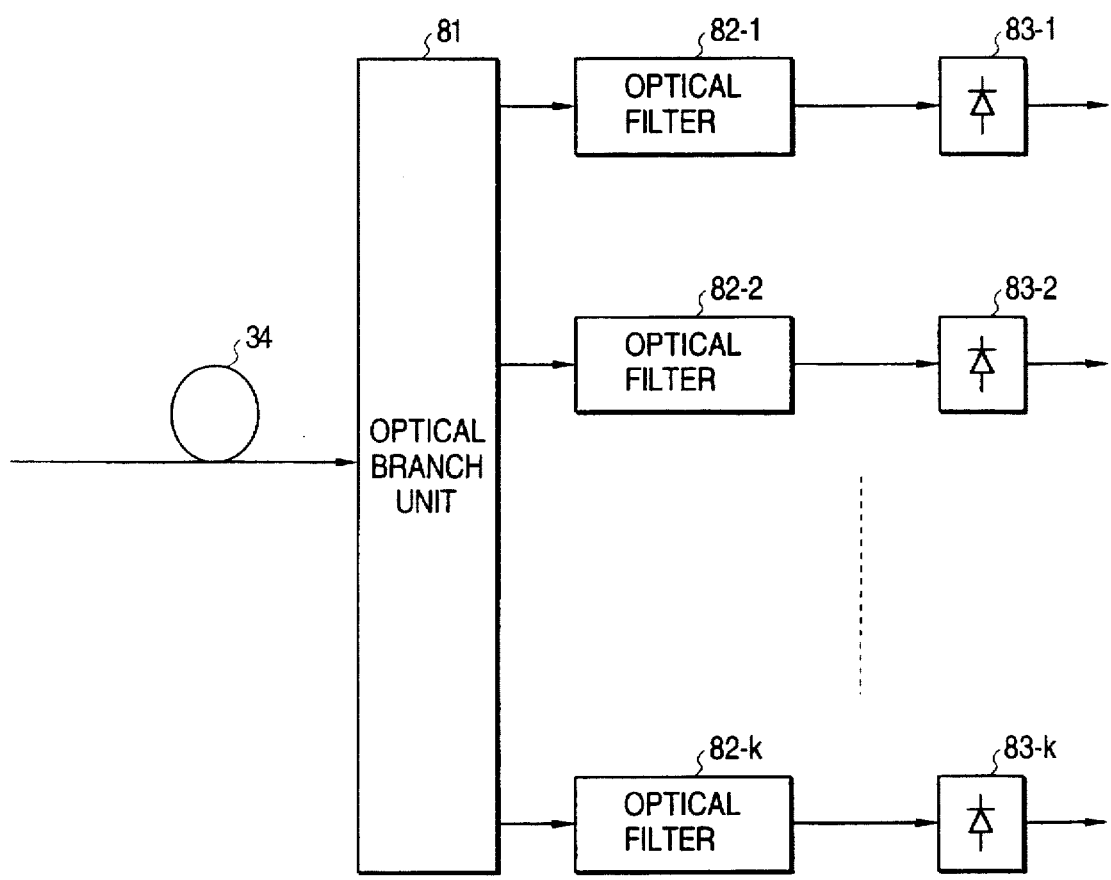
FIG. 12 illustrates an arrangement of the receiver in a second embodiment of the optical communication system of the present invention.

FIG. 12 is a block diagram of the receiving end according to a second embodiment of the optical communication system of the present invention.

As shown in FIG. 12, in this embodiment, the light signal transmitted from the transmitting end shown in FIG. 10 over the optical transmission fiber 34 is applied to an optical branch unit 81, so that it divides into a plurality of channels. Optical filters 82-1 to 82-k separate the optical channel components, which are, in turn, subjected to direct detection in optical receivers 83-1 to 83-k, whereby they are converted to electric signals.

The present embodiment also permits an optical transmission system to be implemented, which is very simple in structure, low in cost and large in capacity as compared with the conventional multiplexed optical transmission system.

Figure 13:
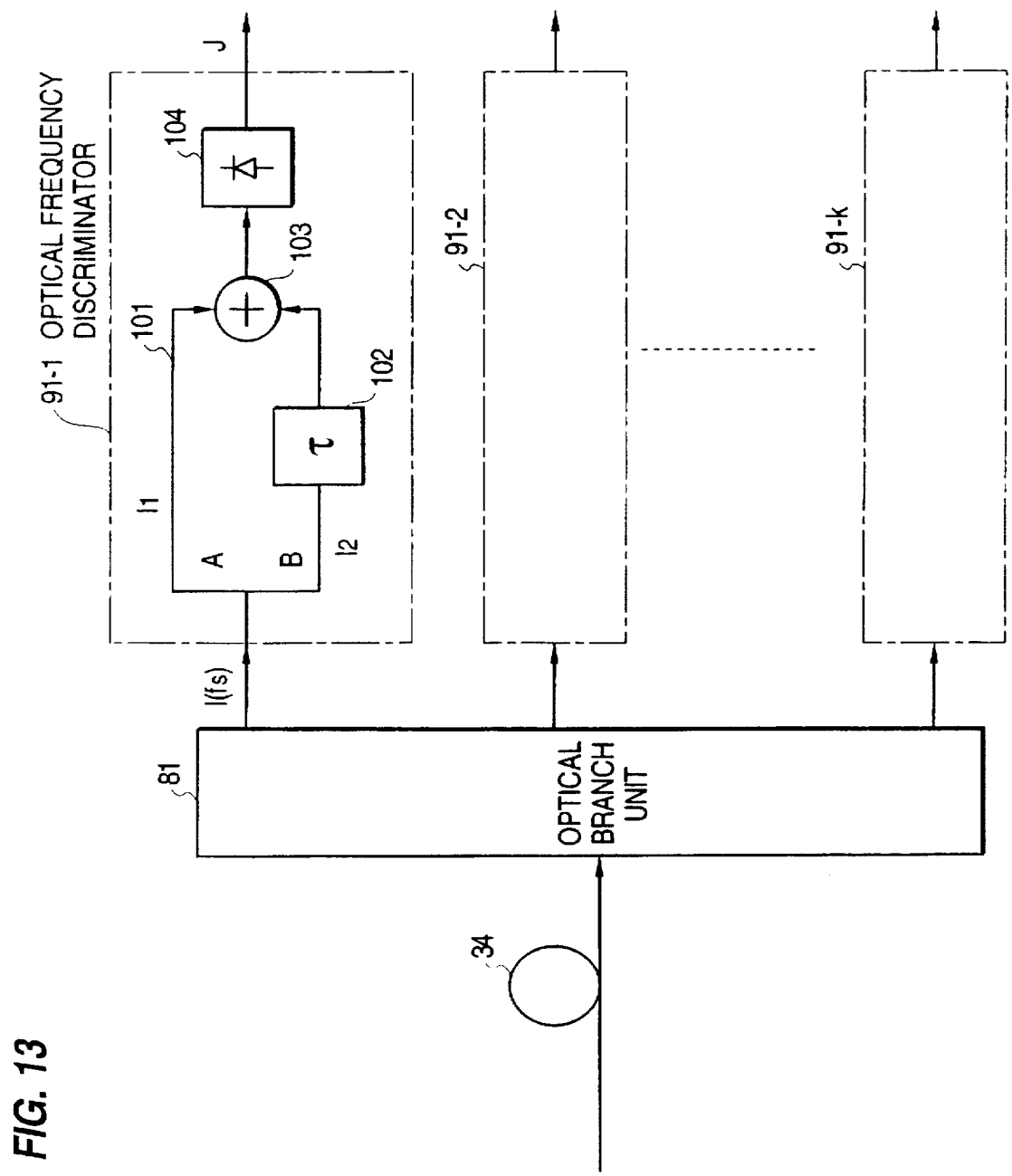
FIG. 13 illustrates an arrangement of the receiver according to a third embodiment of the optical communication system of the present invention.

FIG. 13 is a block diagram of the receiving end according to a third embodiment of the optical communication system of the present invention.

In this embodiment, the light signal transmitted from the transmitting end shown in FIG. 10 over the optical transmission fiber 34 branches into channels through an optical branch unit 81. The optical signal components of channels are separated and direct-detected by optical frequency discriminators 91-1 to 91-k. The arrangement of the optical frequency discriminators is well known. As an example, a discriminator using an optical delay circuit is described herein. That is, the input optical signal (coherent light) is divided into two channels, thereby causing two optical signals $I_1$ and $I_2$ to pass through optical paths 101 and 102, respectively, so as to delay the optical signal $I_2$ by a time &S with respect to the optical signal $I_1$. Subsequently, the two optical signals $I_1$ and $I_2$ are mixed again in an optical mixer 103 and the mixture is converted to an electric signal by an optical receiver 104. The principle of the frequency discrimination in this case will be described below with reference to FIG. 14.

Let the frequency of the input optical signal I be $f_s$. Then $$I = \cos(2\pi f_s t + \phi s(t)) \quad (1)$$

where ∅s(t) stands for the phase.

Supposing the dividing ratio to be A : B, $I_1$, and $I_2$ are given by $$I_1 = A\cos(2\pi f_s t + \phi s(t)) \quad (2)$$

$$I_2 = B\cos(2\pi f_s(t+\tau) + \phi s(t+\tau)) \quad (3)$$

Thus, photocurrent J output from the optical receiver 104 will be given by $$J = C + 2AB \cos(2\pi s\tau + \phi s(t) - \phi s(t-\tau)) \quad (4)$$

In this equation, constant and higher frequency components are neglected.

Figure 14:
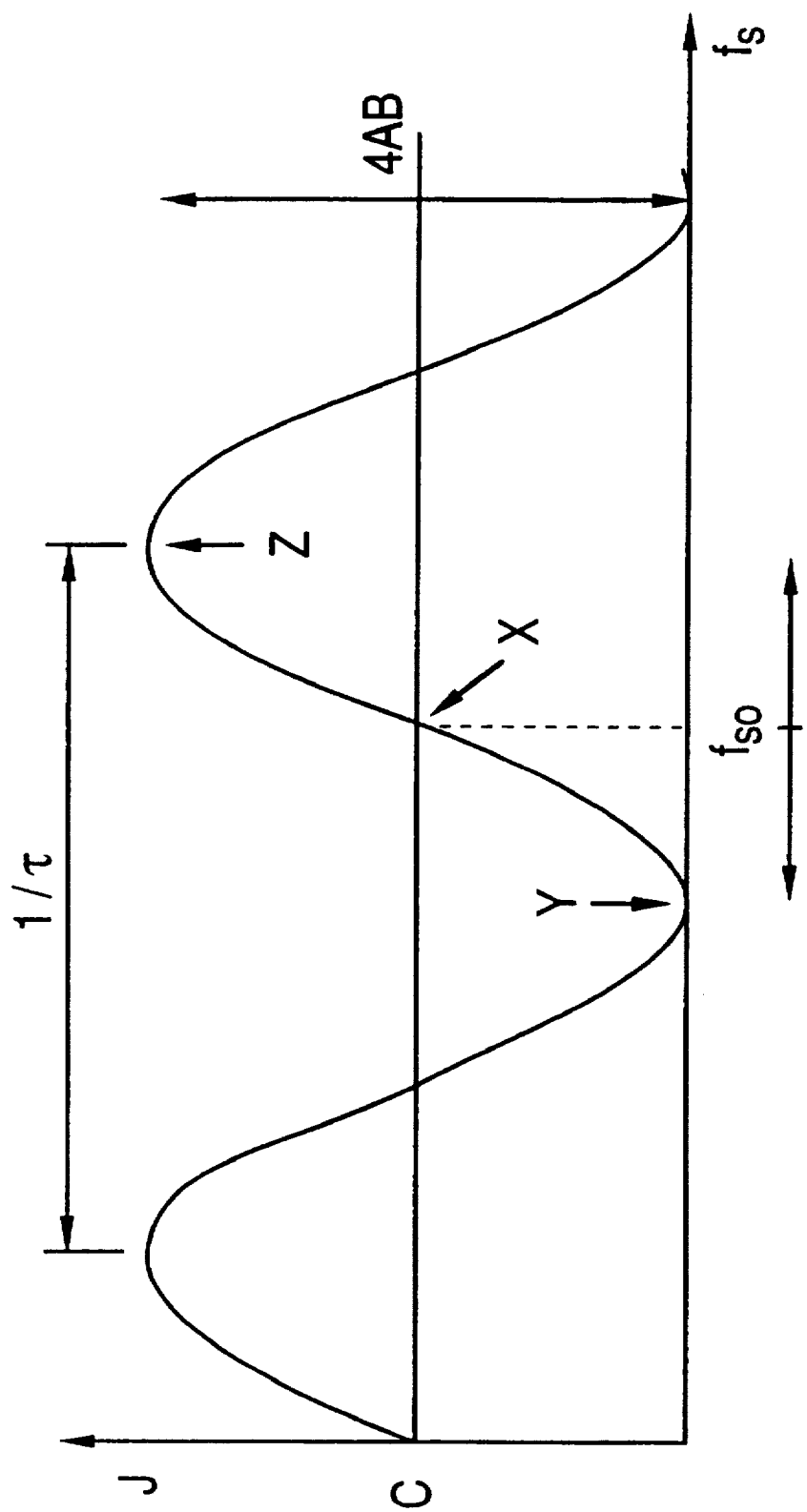
FIG. 14 is a diagram for use in explanation of the principle of the frequency discrimination in the third embodiment.

From equation (4), J varies with fs with a period of 1/τ as shown in FIG. 14. As can be seen from this relationship between J and $f_s$, frequencies in the range from Y point to Z point can be discriminated with a point X (corresponding to frequency $f_{so}$) set as a reference point. By setting the reference point of each of the optical frequency discriminators 61-1 to 61-k to a different frequency, the frequency discrimination can be performed for each of the channels.

Figure 15:
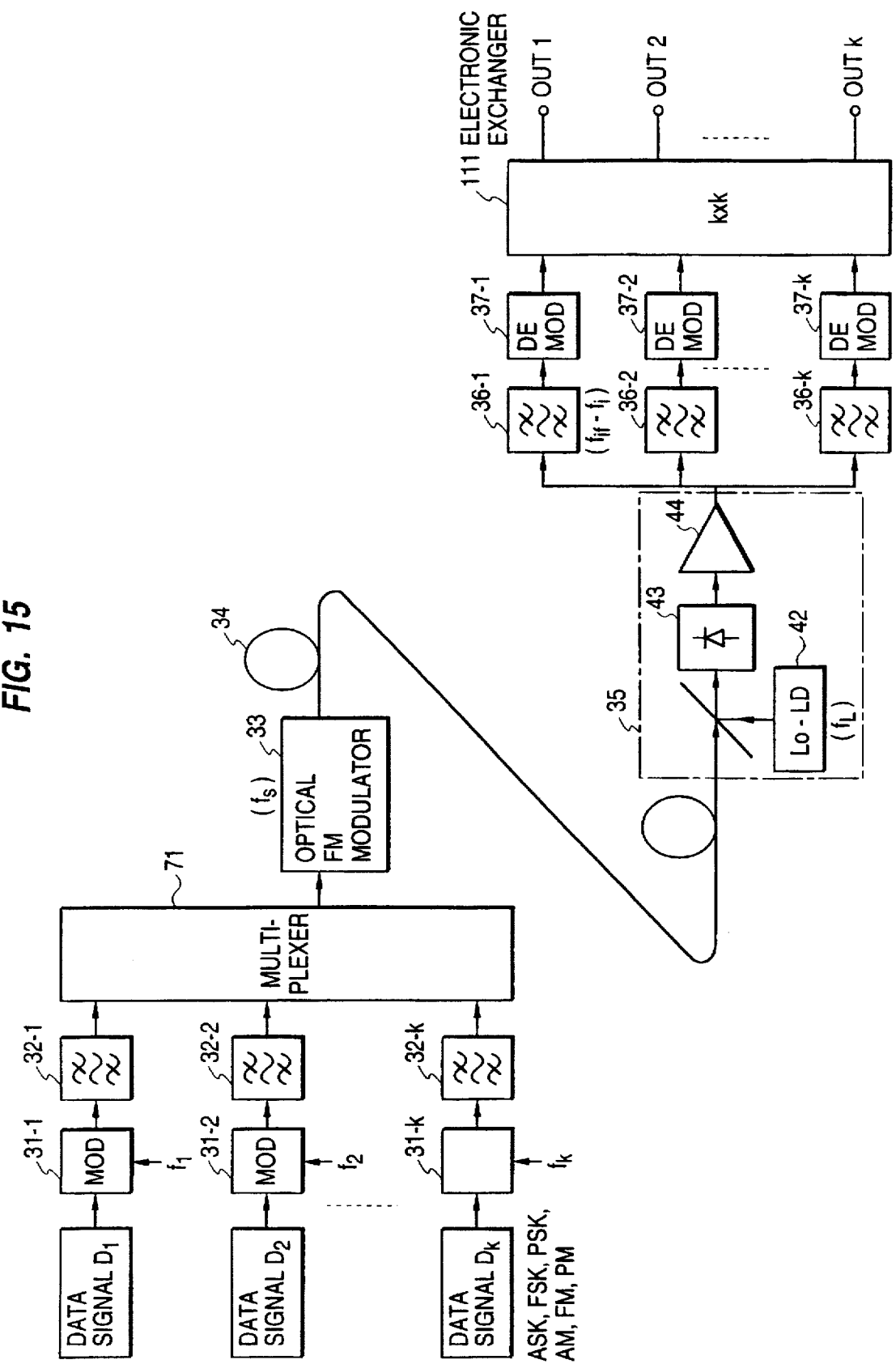
FIG. 15 is a block diagram of a first embodiment of an optical exchange system of the present invention.

FIG. 15 is a block diagram of a first embodiment of an optical exchange system of the present invention.

In this embodiment, an electronic exchange unit 111, which has as many input/output ports (k×k) as there are transmission channels (K), is disposed to succeed the demodulators 37-1 to 37-k at the receiving end in the optical communication system shown in FIG. 10, thereby making exchanges of channels. That is, signals recovered by the demodulators can be exchanged by the electronic exchange unit 111.

The mere placement of an electronic exchange unit to succeed the demodulators in the optical communication system of the present invention permits an optical exchange system to be implemented easily. If, in the arrangement of FIG. 15, an electronic switch is disposed in place of the electronic exchange unit 111, an optical switching system can be implemented which permits switching between channels.

Figure 16:
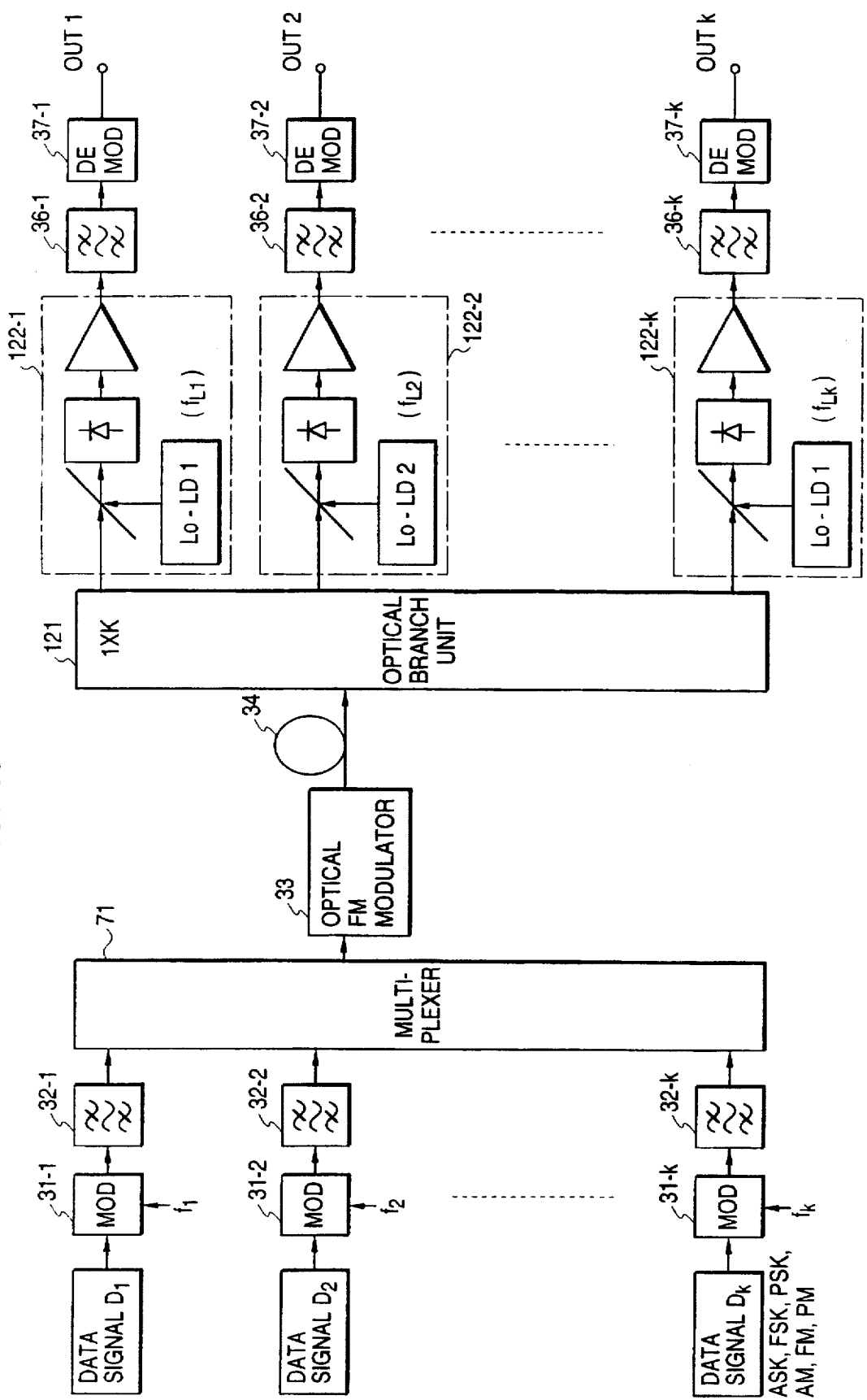
FIG. 16 is a block diagram of a second embodiment of the optical exchange system of the present invention.

FIG. 16 illustrates a second embodiment of the optical exchange system of the present invention.

In this embodiment, as many optical heterodyne detectors each having a separate local light source as there are channels are provided at the receiving end to thereby implement a k×k coherent optical exchange system. That is, the optical signal transmitted from the transmitting end shown in FIG. 10 is divided into as many optical signals as there are transmission channels (k in number). The divided optical signals are heterodyne-detected by their respective optical heterodyne detectors 122-1 to 122-k having their respective local light sources producing different frequencies $f_{L1}$ to $f_{Lk}$ and an arbitrary channel is selected to thereby make an exchange of channels.

In the arrangement of FIG. 15, channel exchange is implemented by using the electronic exchange unit 111. In the present embodiment, on the other hand, the channel exchange is implemented by tuning the oscillation wavelength of the local light source of each of the optical heterodyne detectors 122-1 to 122-k and selecting a desired channel. In the present embodiment as well, an optical switching system can be implemented by switching between channels.

The transmitter in each of the above embodiments uses the principle of the transmitter shown in FIG. 3. If the principle of the transmitter shown in FIG. 4 is used instead, the transmission of more channels will be implemented.

Figure 17:
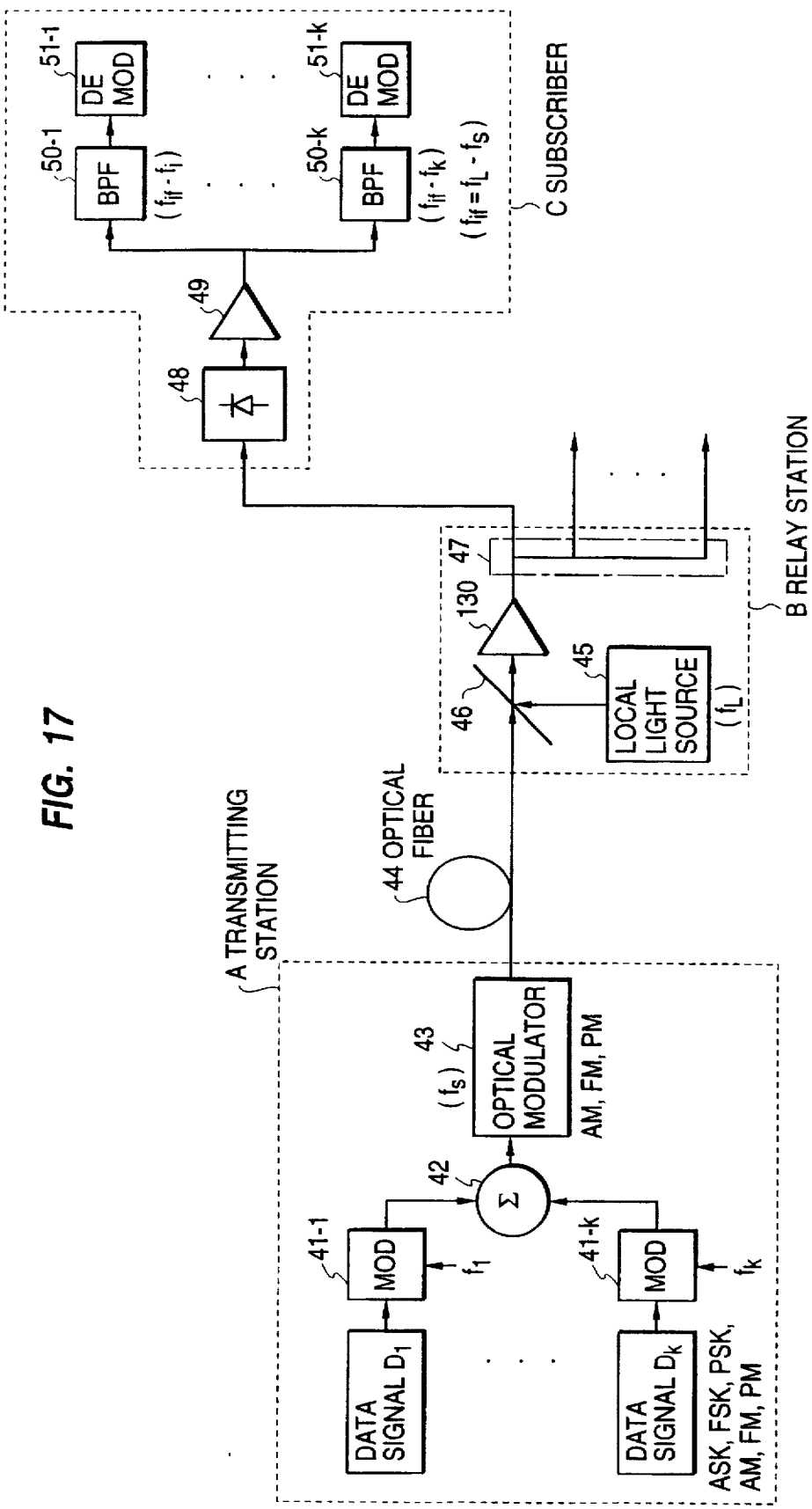
FIG. 17 is a block diagram of a fourth embodiment of the optical communication system of the present invention.

FIG. 17 illustrates a fourth embodiment of the optical communication system of the present invention. In this embodiment, an optical amplifier 130 for compensating for branching loss is disposed between the optical mixer 46 and the optical branch unit 47 in the repeater station B in the arrangement shown in FIG. 5.

In FIG. 17, in the transmitter A, carriers of different frequencies $f_1$ to $f_k$ allocated to channels are modulated with data signals $D_1$ to $D_k$ in the modulators 1-1 to 1-k. Here, the modulation system used in the modulators 41-1 to 41-k may be any of amplitude modulation (AM), frequency modulation (FM), phase modulation (PM), intensity modulation, amplitude-shift keying (ASK), frequency-shift keying (FSK), phase-shift keying (PSK), etc.

Modulated signals obtained from the modulators are combined by a combiner, such as a microwave coupler, to produce a frequency-division multiplexed signal. The channel spacing of the multiplexed signal is selected to avoid crosstalk between adjacent channels. As means therefor, a lowpass filter may be used to allow only the main lobe component of each data signal to pass or a bandpass filter may be used to allow only the main lobe component of each data signal to pass after modulation. Subsequently, the multiplexed signal thus obtained is used to modulate an optical modulator 43 and the resultant modulated light is transmitted over an optical fiber 44. As the optical modulator 43, use may be made of a semiconductor laser or a LiNO₃ modulator. As the modulation system used in the optical modulator 43, use may be made of any of coherent modulation systems including amplitude modulation, frequency modulation, phase modulation, etc.

The optical signal transmitted from the transmitting station A in that way is transmitted to the repeater station B through the optical fiber 44. In the repeater station B, the incoming signal light is mixed in the optical mixer 46 with local light emitted from a local light source (for example, a semiconductor laser) 45 which is common to subscriber's stations and then the resultant light is amplified by the optical amplifier 130 consisting of a fiber type light amplifier or a semiconductor light amplifier. Subsequently, in the optical branch unit 47 the amplified light branches into subscriber's stations C through optical fibers.

In each subscriber's station C, the optical signal transmitted from the repeater station B is converted to an electric signal, whereby it is heterodyne detected. Subsequently, the resultant IF signal is amplified by the amplifier 49 and then divides into channels. The bandpass filters 50-1 to 50-k separate channel signal components in the IF signal and then the channel signal components are demodulated by the demodulators 51-1 to 51-k.

According to the present embodiment, only one local light source 45 provided in the repeater station B permits simultaneous optical heterodyne reception for more than one subscriber. Therefore, each subscriber's station needs no local light source and hence the cost per subscriber can be reduced to a large extent.

Moreover, the loss due to optical branching can easily be compensated for because the mixed light is amplified by the light amplifier 130 provided in the repeater station B before optical branching.

Of course, it is also possible to compensate for branching loss by a light amplifier provided for each of transmission lines after optical branching by the optical branch unit 47 instead of providing the common light amplifier 130 followed by the optical branching unit. Further, the light amplification may be provided before and after branching.

Next, countermeasures against polarization fluctuation for carrying out the present invention will be considered. In order to carry out the optical heterodyne reception, the signal light and the local light must be coincident with each other in the state of polarization. If they are not coincident with each other, for example, in an extreme case, in the case of linear polarization in which they are perpendicular to each other in polarization, the reception is impossible. As countermeasures against such problems, there will be methods of using (1) a polarization preserving fiber, (2) a polarization diversity reception system, (3) a polarization active control reception system, (4) a polarization scrambling system, etc. In (1), the polarization preserving fiber is not suitable because it is expensive and fibers which have already been installed become unavailable. In (2), the polarization diversity reception is promising for usual coherent optical transmission systems, but a subscriber's receiver needs a dual configuration, increasing its cost. In the present invention, a local light source and a receiver are away from each other and thus it is difficult to feed an IF signal back to the local light source. Thus, (3) and (4) will be considered hereinafter.

Figure 18:
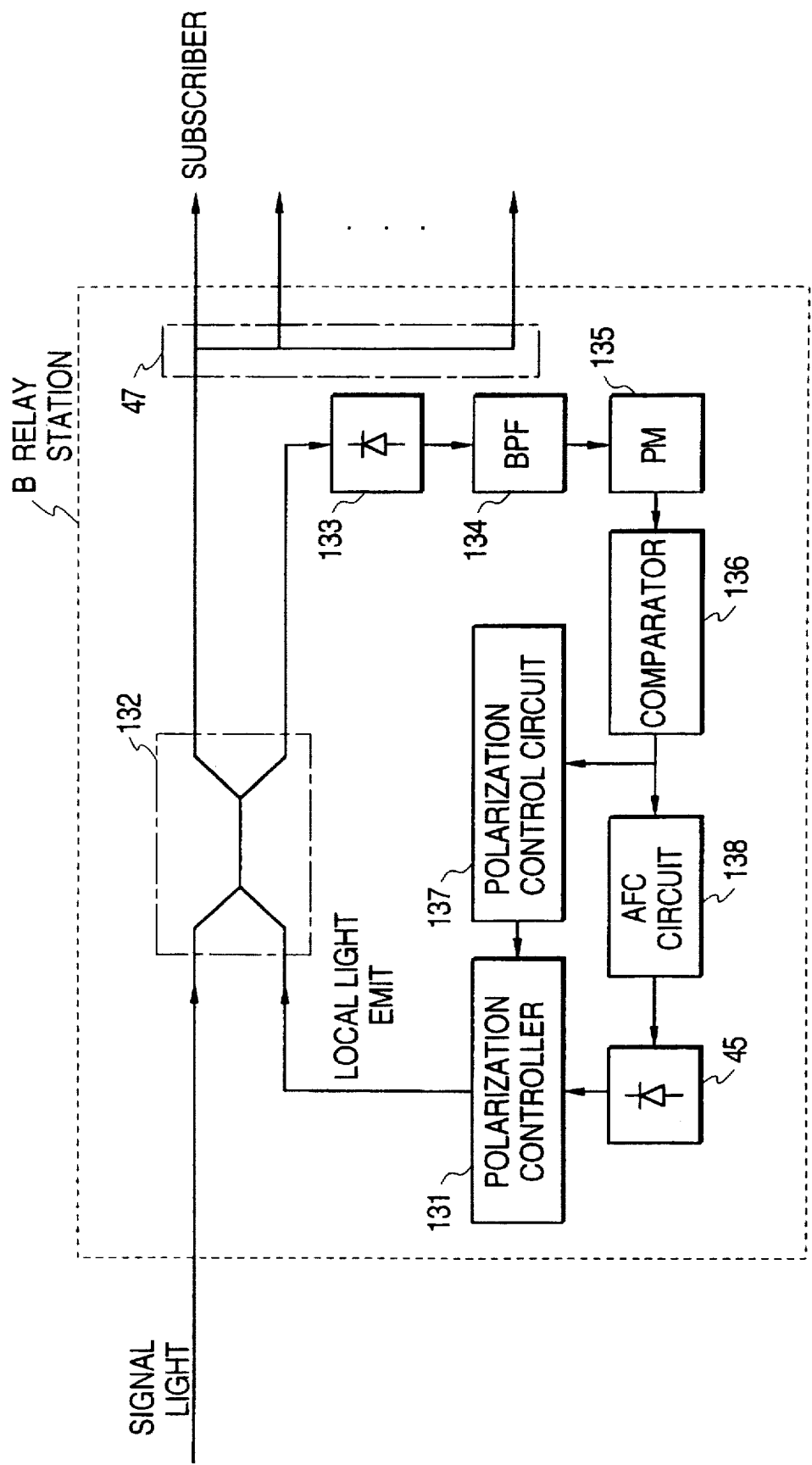
FIG. 18 is a block diagram of a fifth embodiment of the optical communication system of the present invention.

FIG. 18 is a block diagram of the repeater station B according to a fifth embodiment of the optical communication system of the present invention. This embodiment uses the method (3), i.e., the polarization active control reception system as the countermeasures against polarization.

As shown in the figure, in the repeater station B, the signal light transmitted from the transmitting station A shown in FIG. 17 and local light obtained from the local light source 45 via a polarization controller 131 are mixed in a 2×2 optical coupler 132 and then divided into two branches. A signal on one of the branches is transmitted to subscriber's stations and the other is used as a monitor signal for polarization control.

For polarization control, the other signal from the optical coupler 132 is subjected to heterodyne detection in an optical receiver 133. At this point, as a detected signal, a 0 th-order beat signal (main-carrier component) or one-channel component in the SCM signal is derived through a bandpass filter 134. The power of the IF signal thus obtained is measured by a power meter 135 and the measured value is then compared with a reference value by a comparator 136. Based on the difference between the measured value and the reference value, the polarization controller 131 is controlled by a polarization control circuit 137 to match the polarization state of the local light to that of the signal light, and the oscillation frequency of the local light source 45 is controlled by an AFC circuit 138, thereby maximizing the power of the IF signal. Such feedback to the polarization state of the local light and the oscillation frequency permits very good receiver sensitivity.

As the sequence of feedback control in this case, using a signal switching unit, the difference signal from the comparator 136 is first applied to the polarization control circuit 137 to thereby perform the polarization control by the polarization controller 131, and then the difference signal is applied to the AFC circuit 138 to thereby control the oscillation frequency of the local light source 45.

As the polarization controller 131, for example, λ/4 (quarter-wavelength) plate and λ/2 (half-wavelength) plate may be used in combination.

Figure 19:
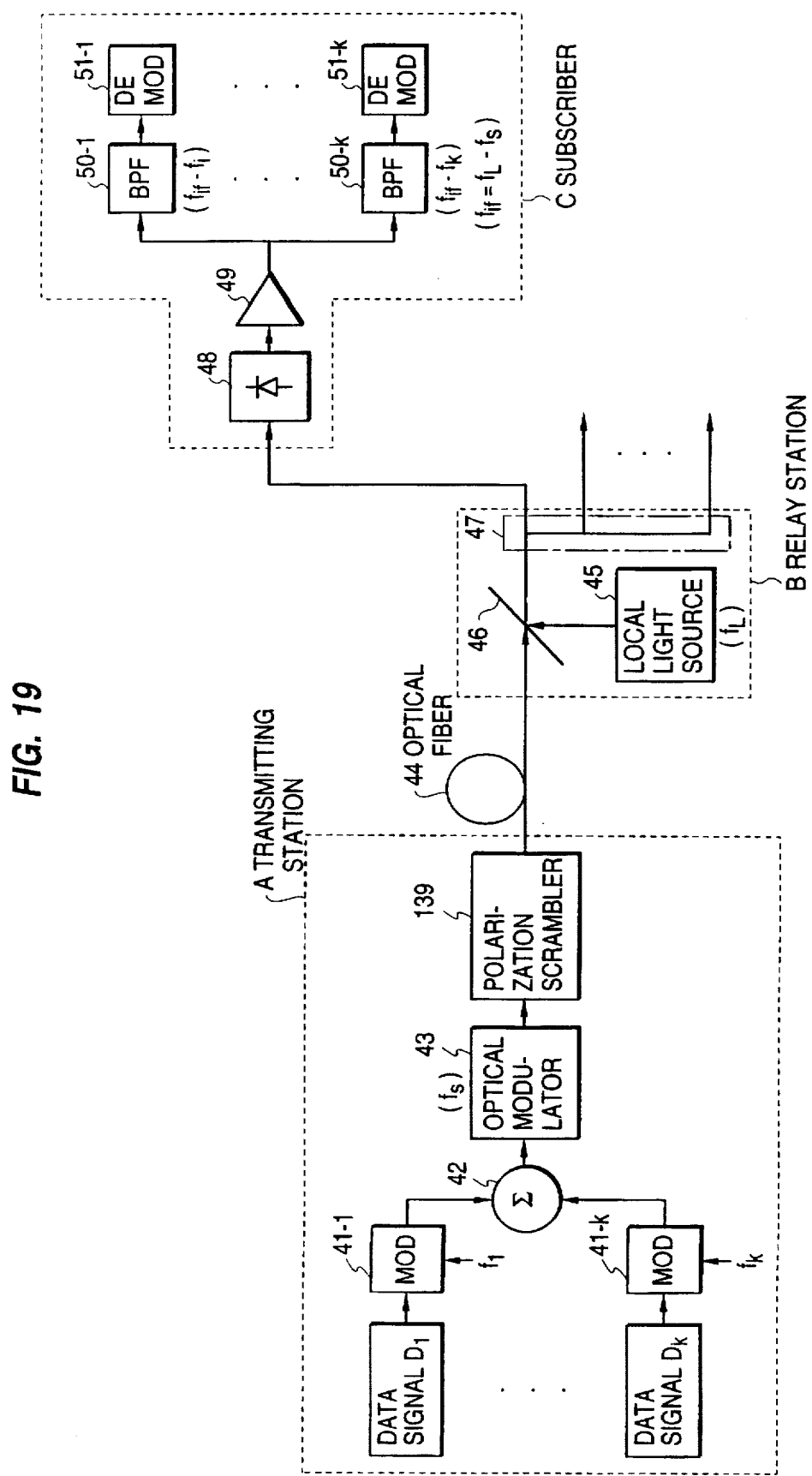
FIG. 19 is a block diagram of a sixth embodiment of the optical communication system of the present invention.

FIG. 19 is a block diagram of a sixth embodiment of the optical communication system of the present invention. This embodiment uses the above method (4), i.e., the polarization scrambling system as countermeasures against polarization.

As shown in the figure, a polarization scrambler 139 is disposed to follow the optical modulator 43 in the transmitting station A shown in FIG. 17, thereby scrambling the polarization in the modulated optical signal obtained from the optical modulator prior to optical transmission thereof. Although there is some reduction in receiver sensitivity, such scrambling of polarization permits polarization-insensitive optical heterodyne reception.

Figure 20:
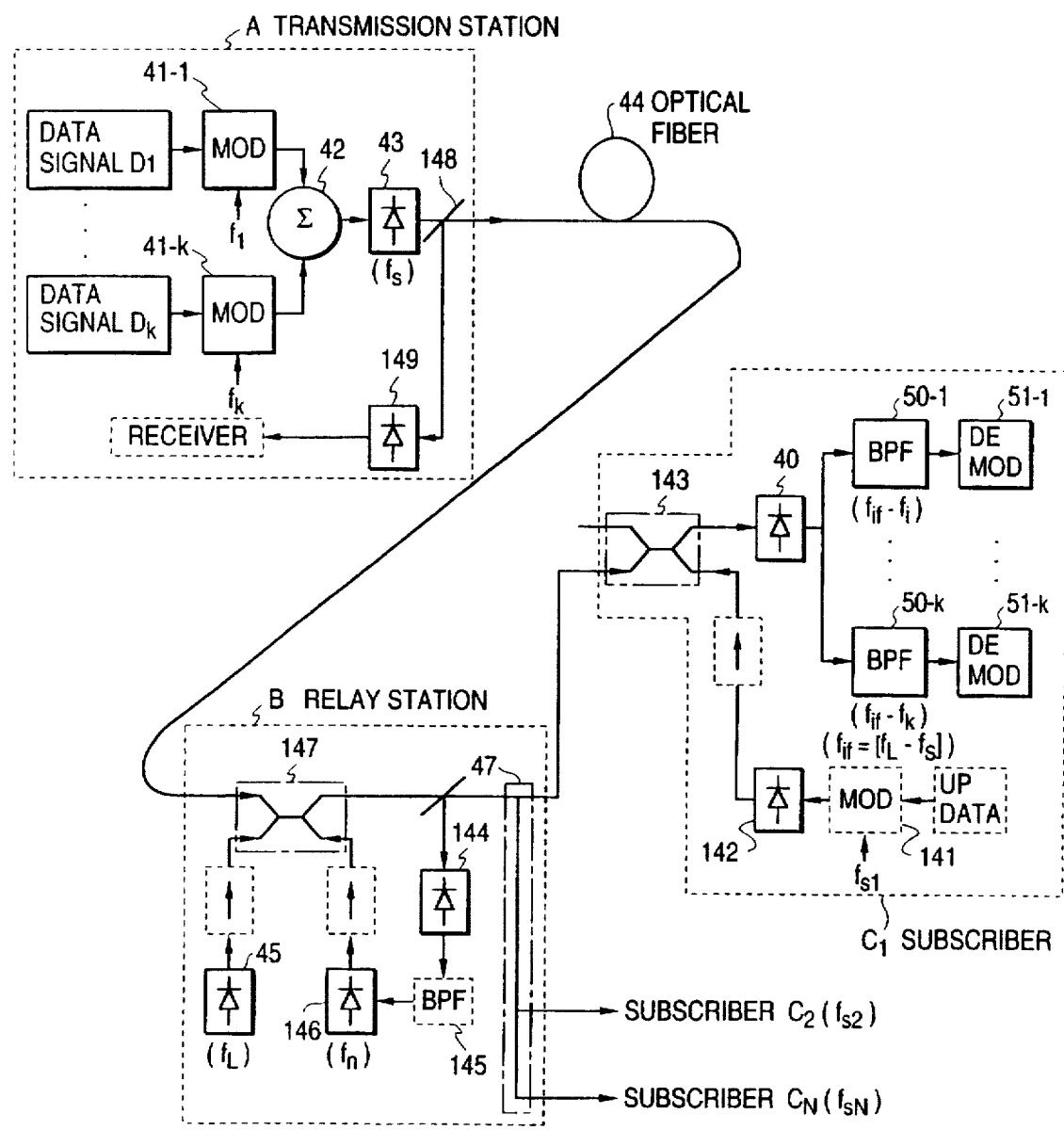
FIG. 20 is a block diagram of a seventh embodiment of the optical communication system of the present invention.

FIG. 20 illustrates a seventh embodiment of the optical transmission system of the present invention. This embodiment is directed to a bi-directional optical communication network using the optical communication system shown in FIG. 17.

In this embodiment, subscriber stations C1, C2, . . . , Cn are allocated different carrier frequencies fs1, fs2 . . . , fsn. The carrier is modulated with a subscriber's data signal in a modulator 141, and the resultant modulated signal is used to modulate an optical modulator 142 for data transmission. The modulated optical signal from the optical modulator 142 is transmitted, as an up signal, from an optical coupler 143 to the repeater station B over the same route as the down line. In this case, as the optical modulator 142, use may be made of an inexpensive semiconductor laser for low-speed optical modulation because the transmission distance is short, and the data signal from each subscriber is usually not of large capacity. As the modulation system, amplitude modulation will be used.

The optical signal from each subscriber station is converted to an electrical signal by an optical receiver 144 in the repeater station B. A signal of frequencies allocated to each subscriber C is detected by a bandpass filter 145. The resultant RF-signal combined signal (SCM signal) modulates an optical modulator 146 for up signals. The modulated optical signal is coupled with the optical fiber 44 by an optical coupler 147 for transmission to the transmitting station A over the optical fiber.

In the transmitting station A, the transmitted optical signal branches in an optical branch unit 148 and then detected by an optical receiver 149. As the optical modulation and detection system in this case, use may be made of the coherent modulation and demodulation system as in the case of the down signal or the amplitude modulation—direct detection system if the speed of the up signal is low in comparison with the down signal.

According to the present embodiment, a bi-directional optical communication network can be implemented at a very low cost because the arrangement in which a single local light source 45 common to all the subscriber stations is installed in the repeater station permits bi-directional optical communication.

Of course, an up signal from each subscriber can also be used as a request signal to the repeater station B or the transmitting station A. With the above arrangement, all of the channels can be received by each subscriber station. Where there are too many channels or each subscriber's receiver has an insufficient bandwidth to cover all the channels, the request signal can be used to tune the oscillation frequency of the local light source 45 to select a desired channel. In this case, however, more than one local light source would be required in the repeater station B.

In the above fourth to seventh embodiments, a single transmission light source (optical modulator 43) is used. The use of two or more transmission light sources with different oscillation frequencies to transmit light composed of optical signals each modulated with an SCM signal as in the above embodiments permits wavelength-division multiplex transmission of coherent SCM optical signals. Optical communication of still larger capacity is made possible.

Next, a description will be made of embodiments incorporating countermeasures against polarization which permit a more inexpensive coherent SCM optical transmission system.

Figure 21:
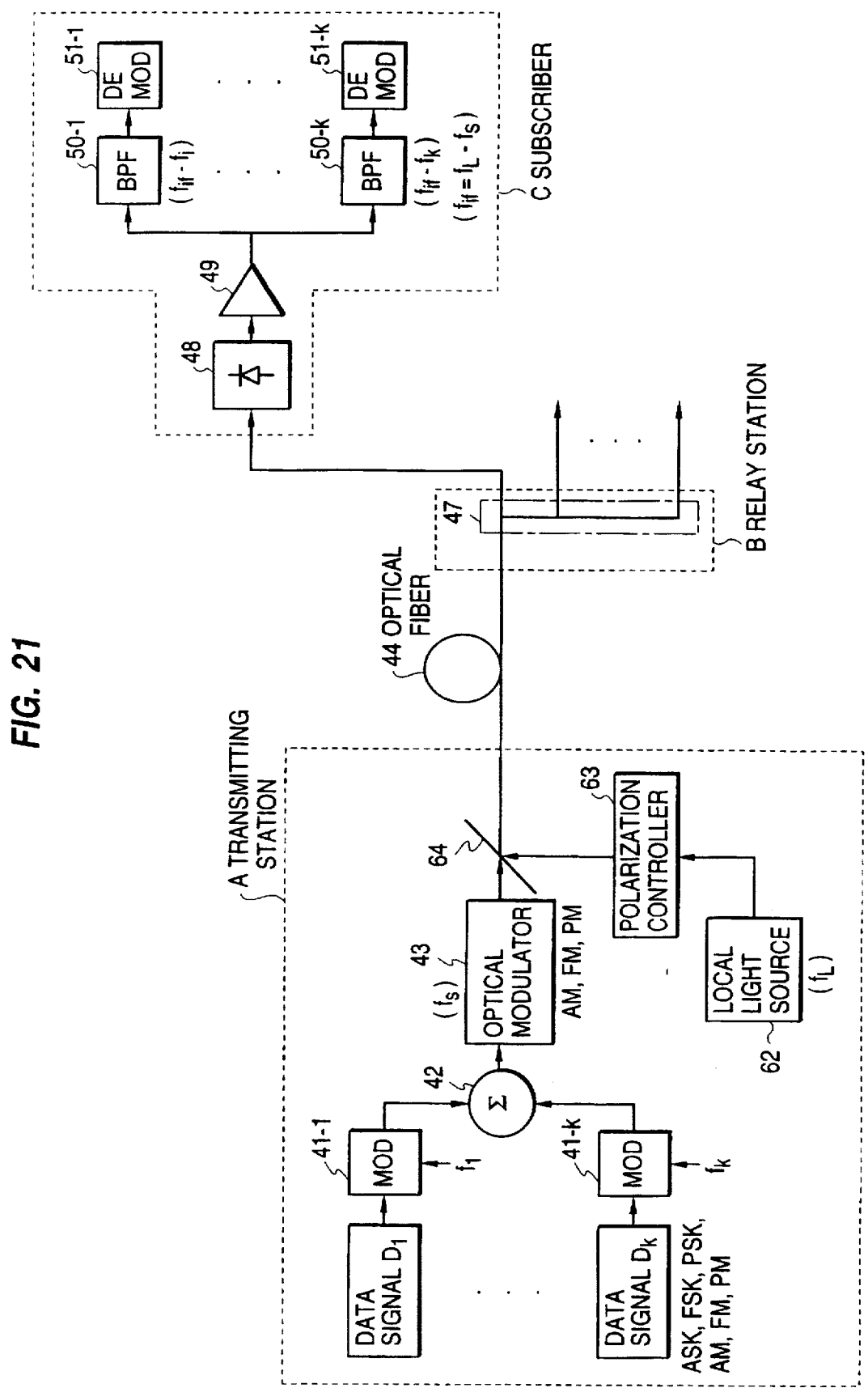
FIG. 21 is a block diagram of an eighth embodiment of the optical communication system of the present invention.

FIG. 21 illustrates an eighth embodiment of the optical communication system of the present invention. The present embodiment is an application of the arrangement shown in FIG. 6 to the SCM optical transmission system.

As shown in FIG. 21, in the transmitting station A, a modulated optical signal (SCM optical signal) output from the optical modulator 43 is mixed with the local light output from the local light source 62 in the optical mixer 64. Before mixing, the local light is made coincident with the modulated signal in polarization in the polarization controller 63. The mixed light is transmitted over the optical fiber 44.

The optical signal thus transmitted optically branches in the optical branch unit 47 in the repeater station B placed in the neighborhood of subscribers for fiber transmission to each subscriber.

In each subscriber station C, as in the above embodiments, the optical signal transmitted from the repeater station B is converted to an electric signal by the optical receiver 48, whereby it is heterodyne detected. The resultant IF signal is separated into channel components by bandpass filters, and then the channel components are demodulated by their respective demodulators. There is no need for an optical branch if transmission is made between one transmitter and one receiver.

According to the present embodiment, since the local light source 62 is installed in the transmitting station A, the transmission light and the local light are mixed after they have been made coincident with each other in polarization, and the resultant mixed optical signal is transmitted. The countermeasures against polarization in the coherent SCM optical transmission system can be implemented without imposing a burden of cost on each subscriber C.

To counter polarization, use may be made of a polarization active control receiving system such as that shown in FIG. 18 or a polarization scrambling system such as that shown in FIG. 19. With the former system, although it has high receiver sensitivity, there is some increase in cost because it is technically difficult to implement the polarization controller 131 which traces random variations in polarization. With the latter, it is somewhat difficult to implement the polarization scrambler 139 which can take sufficient measures against high-speed transmission. However, the system used in the present embodiment has no such problems and can implement a polarization-independent coherent SCM optical transmission system at a low cost corresponding to a network.

Figure 22:
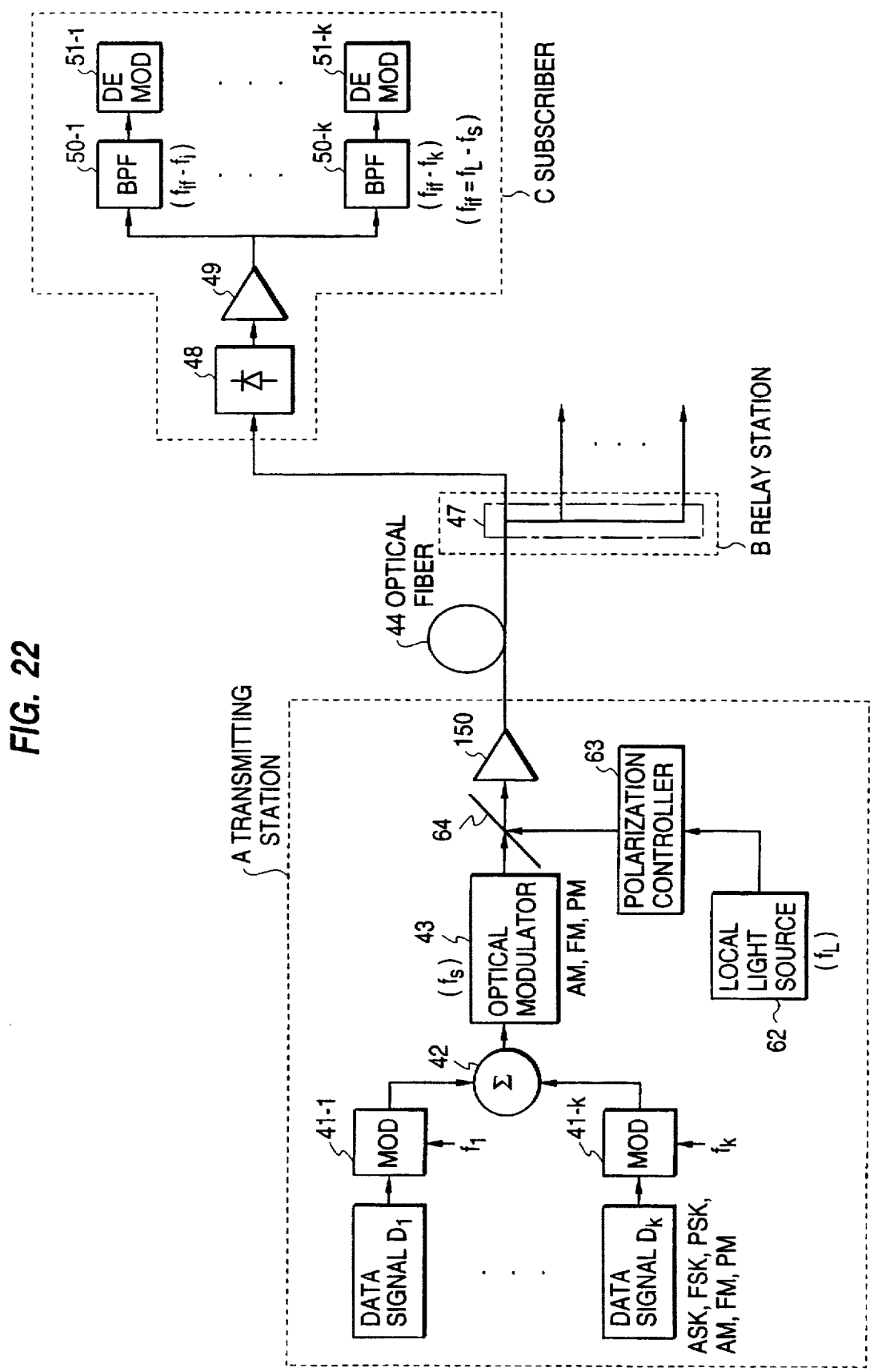
FIG. 22 is a block diagram of a ninth embodiment of the optical communication system of the present invention.

FIG. 22 illustrates a ninth embodiment of the optical communication system of the present invention.

In this embodiment, a light amplifier 150 is installed as a post amplifier in the transmitting station A.

According to this arrangement, the power of a signal from the transmitting station A is amplified, thus increasing the system margin, the transmission distance and the number of branches.

Figure 23:
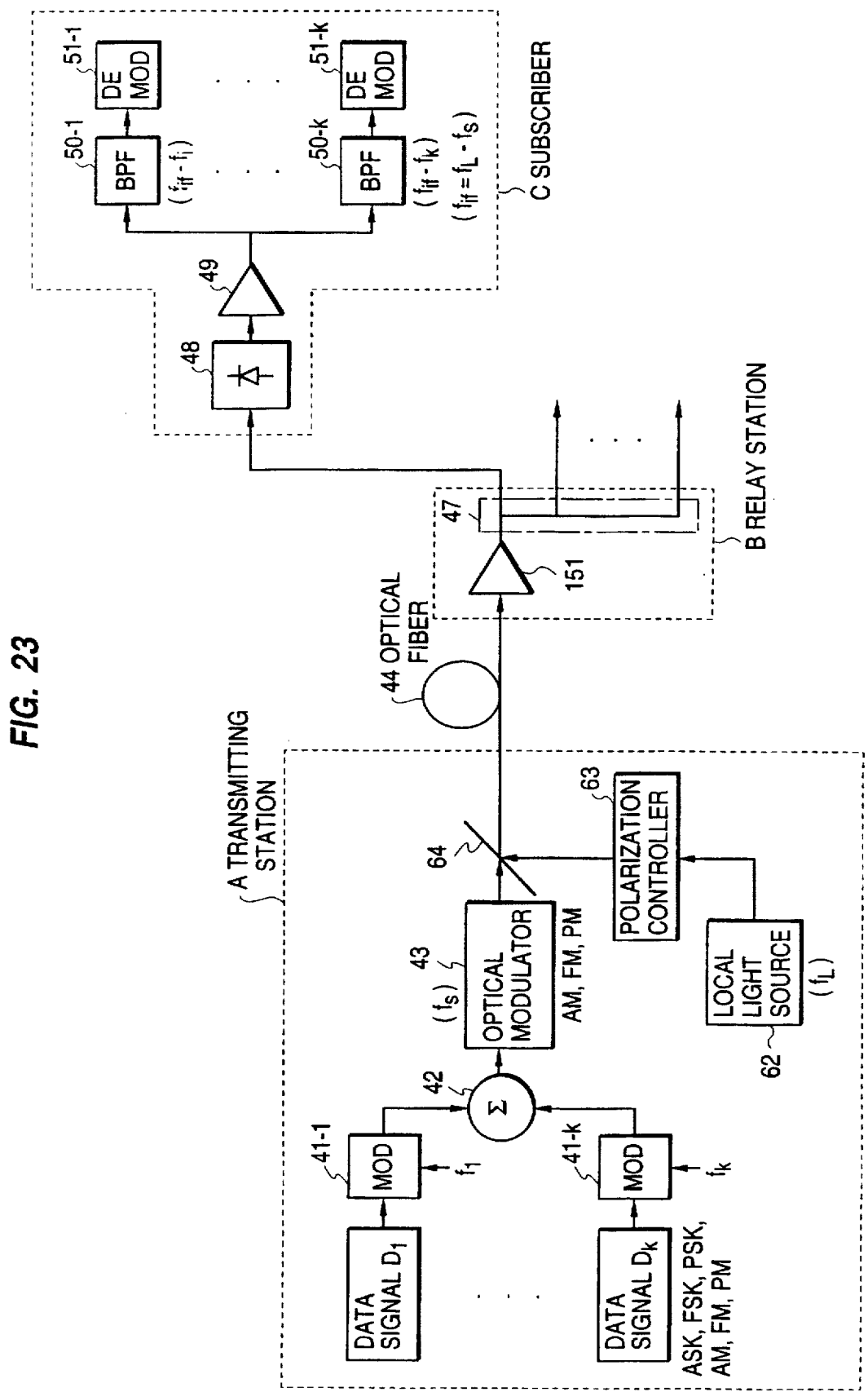
FIG. 23 is a block diagram of a tenth embodiment of the optical communication system of the present invention.

FIG. 23 illustrates a tenth embodiment of the optical communication system of the present invention.

In this embodiment, a light amplifier 151 is installed in the preceding stage of the optical branch unit 47 in the repeater station B in the arrangement of FIG. 21.

According to this arrangement, branch loss caused by the optical branch unit 47 can be compensated for by the light amplifier 151, thus permitting an increase in the number of branches.

Following the branching process by the optical branch unit 47, a light amplifier may be used for each line. In this case, though an improvement is made in receiver sensitivity, as many light amplifiers as there are subscribers will be needed. In addition, light amplifiers may be provided in the preceding and succeeding stages of the optical branch unit. Furthermore, these arrangements and the arrangement of FIG. 22 may be used in combination.

Figure 24:
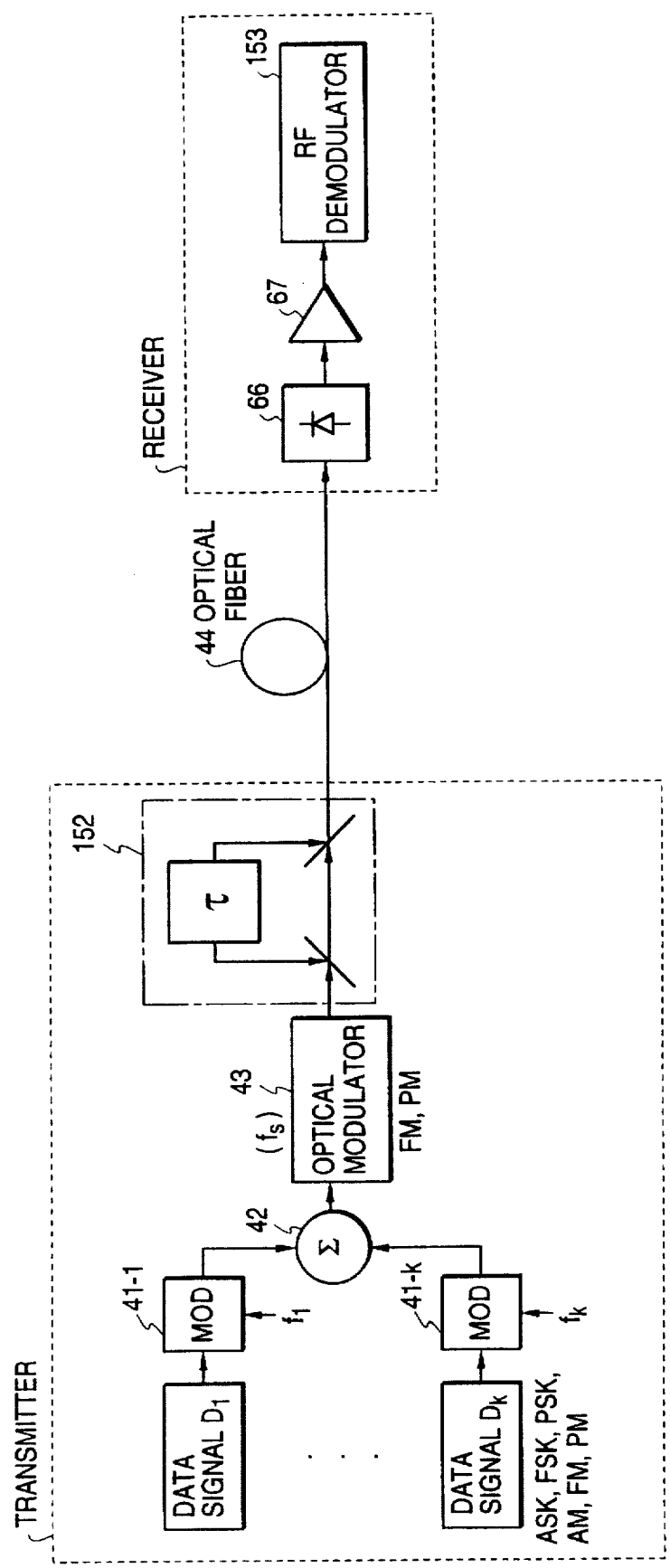
FIG. 24 is a block diagram of an eleventh embodiment of the optical communication system of the present invention.

FIG. 24 illustrates an eleventh embodiment of the optical communication system of the present invention. This embodiment is arranged such that an angle modulated optical signal is converted to an intensity modulated optical signal which is subsequently transmitted.

As shown in the figure, in the transmitting station T, an SCM optical signal resulting from production of optical angle modulation (FM, PM) in the optical modulator 43 is transmitted over the optical fiber after being converted to an amplitude modulated optical signal by an optical frequency discriminator 152.

In the receiver R, the optical signal transmitted from the transmitting station is converted to an electrical signal by the optical receiver 66, and the resultant RF signal is applied via the amplifier 67 to an RF demodulator 153 where it is demodulated.

As described so far, the present invention is permitted to use any of AM, FM and PM as its optical modulation system. As described in the Related Art, the amplitude modulation, when it is produced by intensity modulation of a semiconductor laser, requires a linear relationship between intensity modulation and optical output. Thus, there is a limit to the modulation bandwidth. Under the present conditions, the bandwidth lies in the range of 1 to 2 GHz at best. Therefore, wideband information transmission is liable to be affected by signal distortion, thus limiting the capacity of information to be transmitted. However, the amplitude modulation offers an advantage in that receivers can be made simple in structure because direct detection as well as coherent detection can be employed.

The arrangement of FIG. 24, which is obtained on the basis of such viewpoints, transmits amplitude modulated light, so that receivers can be made simple in structure, and signal transmission is not affected by fluctuations in the state of polarization within the optical fiber 44.

The characteristics of the optical frequency discriminator 152 serving as means of converting optical angle modulation to optical amplitude modulation is the same as that shown in FIG. 14.

For optical frequency discrimination, a method of using a Michelson interferometer would be considered.

To convert optical angle modulation to optical amplitude modulation, not only an optical frequency discriminator which is used herein may be used.

In the above eighth to eleventh embodiments, a single transmission light source (optical modulator 43) is used. The transmission to two or more transmission light sources with different oscillation frequencies light which has been synthesized after polarization synthesis (or angle modulation to intensity modulation conversion) as in the above embodiments permits wavelength-division multiplexed transmission of coherent SCM optical signals with no polarization dependence. Optical communication with still larger capacity is made possible.

According to the present invention shown in FIGS. 3 and 4, frequency-division multiplexing can be implemented easily by the use of a microwave coupler and a multiplexed signal can be modulated optically by the use of a single optical modulator. Thus, large-capacity frequency-division multiplexed optical transmission can be implemented easily and at a low cost. Moreover, since each channel signal can be filtered by an electric (bandpass) filter in frequency-division multiplexing of channel signals, the channel spacing can be set narrow as compared with the conventional optical frequency-division multiplexing system. As a result, a single receiver permits simultaneous reception of a large number of channels. Furthermore, a high-sensitivity reception system such as an optical heterodyne system can be used, permitting long-distance transmission with high receiver sensitivity or a distribution network to be implemented easily.

With the invention in which incoming signal light and local light are mixed before branching as shown in FIG. 5, the use of a single optical carrier permits high-density frequency-division multiplexed transmission. Thus, a high-sensitivity coherent high-speed transmission network capable of long-distance, multidistribution transmission can be implemented easily and at low cost. Moreover, the use of the present invention permits the implementation of an optical communication system having a wide range of applicability such as a bi-directional optical transmission network.

In addition, as described in FIG. 6, the invention in which signal light and local light are mixed after their polarization states have been made coincident with each other and then transmitted, or the invention in which an angle modulated optical signal is converted to an intensity modulated optical signal for transmission permits, multi-distribution transmission. Moreover, a polarization-insensitive high-sensitivity coherent optical transmission network can be implemented easily and at low cost. An optical communication network having a wide range of applicability can be built.

I claim:

1. An optical communication system comprising:
   a plurality of optical frequency modulated signal generating units, each optical frequency modulated signal generating unit including
      a plurality of channel transmitting portions for transmitting a respectively corresponding plurality of data signals, each channel transmitting portion comprising
         a modulator modulating a carrier with the data signal corresponding to the respective channel transmitting portion, to thereby produce a first transmission signal, each carrier modulated by a modulator of the respective optical frequency modulated signal generating unit being at a different frequency, and
         a filter filtering the first transmission signal to limit a transmission band of the first transmission signal, to thereby produce a second transmission signal, and
      a combining unit combining the second transmission signals of the channel transmitting portions of the respective optical frequency modulated signal generating unit, to thereby produce a multiplexed signal, and
      an optical frequency modulator modulating the multiplexed signal; and
   an optical mixer mixing together the modulated multiplexed signal of each optical frequency modulated signal generating unit, to thereby produce an optical frequency multiplexed signal for transmission to a receiver, wherein the optical frequency multiplexed signal includes a signal component in an intermediate frequency band.

2. An optical communication system as claimed in claim 1, wherein said optical frequency modulator is a semiconductor laser having a bias current, the optical frequency modulator modulating the multiplexed signal produced by the combining unit via direct modulation of the bias current.

3. An optical communication system according to claim 1, further comprising:
   optical detecting means for mixing the optical frequency multiplexed signal and local light to obtain an optical signal assigned the intermediate frequency band, and for converting the optical signal to an electric signal of an intermediate frequency band, the electric signal thereby including channel components corresponding, respectively, to a plurality of channels;
   a plurality of band filters corresponding, respectively, to the plurality of channel components included in the electric signal, each band filter extracting the corresponding channel component from the electric signal; and
   a plurality of demodulators corresponding, respectively, to the plurality of band filters, each demodulator demodulating the channel component extracted by the corresponding band filter.

4. An optical communication system as claimed in claim 3, comprising:
   an electronic exchanger receiving the demodulated channel components from the plurality of demodulators, for optionally switching transmission channels.

5. An optical communication system as claimed in claim 1, further comprising:

an optical branch unit branching the optical frequency multiplexed signal produced by the optical mixer into a plurality of branched signals;

detector the branched signals branched by the optical branch unit to electric signals each having an intermediate frequency band and including channel components corresponding to a plurality of channels;

a plurality of band filters corresponding, respectively, to the channel components in the electric signal, each band filter extracting the corresponding channel component from the electric signal; and a plurality of demodulators corresponding, respectively, to the plurality of band filters, for demodulating the channel component extracted by the corresponding band filter.

6. An optical communication system according to claim 1, further comprising:

mixing means for obtaining an optical signal having an intermediate frequency by mixing the optical frequency multiplexed signal produced by the optical mixer and local light;

an optical branch unit, connected to said mixing means, branching the optical signal having the intermediate frequency band into a plurality of branched optical signals;

a plurality of detectors, coupled to the optical branch unit, detecting the plurality of branched optical signals, and converting the branched optical signals to electric signals each having the intermediate frequency band and including channel components corresponding, respectively, to a plurality of channels;

a plurality of band filters corresponding, respectively, to the plurality of channel components and coupled to a respective detector of the plurality of detectors, each band filter extracting the corresponding channel component from the electric signal of the detector coupled thereto; and a plurality of demodulators corresponding, respectively, to the plurality of band filters, each demodulator demodulating the channel component extracted by the corresponding band filter.

7. An optical communication system as claimed in claim 6, further comprising:

an amplifier amplifying the optical signal obtained by said mixing means.

8. An optical communication system as claimed in claim 6, further comprising:

polarization control means for controlling polarization of the optical frequency multiplexed signal produced by the optical mixer.

9. An optical communication method comprising the steps of:

a) mixing signal light and local light with a polarization of the signal light coinciding with a polarization of the local light, to thereby produce a mixed light;

b) optically transmitting the mixed lights;

c) detecting the transmitted, mixed light and converting the detected light into a converted electric signal; and d) extracting an electric signal from the converted electric signal by a band-pass filter, the extracted electric signal being in an intermediate frequency band including a frequency component of a channel.

10. An optical communication method as claimed in claim 9, further comprising the step of:

dividing the transmitted mixed light.

11. An optical communication method as claimed in claim 9, further comprising the step of:

amplifying the transmitted, mixed light.

12. An optical communication method for transmitting a plurality of optical signals which each have a different carrier frequency corresponding to different channels, each optical signal having a corresponding local light signal, the method comprising the steps of:

a) mixing each of the plurality of optical signals with the corresponding local light signal after polarization states of each respective optical signal and the corresponding local light signal are made coincident with each other, to thereby produce a plurality of multiplexed optical signals;

b) combining the multiplexed optical signals, to thereby produce a combined signal;

c) optically transmitting the combined signal;

d) detecting the transmitted, combined signal and converting the detected signal into an electric signal; and e) extracting an electric signal from the converted electric signal with a band-pass filter, the extracted electric signal being in an intermediate frequency band including a frequency component of each channel.

13. An optical communication method comprising the steps of:

a) allocating transmission signals on more than one channel having different microwave frequencies;

b) modulating carriers of the microwave frequencies with the transmission signals, to thereby produce modulated signals;

c) combining the modulated signals, to thereby produce a multiplexed signal;

d) modulating an optical frequency modulator with the multiplexed signal, to thereby produce a modulated optical signal;

e) mixing the modulated optical signal with local light with polarization states of the modulated optical signal and the local light made to be coincident with each other, to thereby produce a mixed light signal, and optically transmitting the mixed light signal;

f) detecting the transmitted, mixed light signal and converting the detected signal into a converted electric signal;

g) extracting an electric signal from the converted electric signal with a band-pass filter, the extracted electric signal being in an intermediate frequency band including a frequency component of each channel;

h) extracting channel signals from the extracted electrical signal by filters; and i) demodulating each of the extracted channel signals.

14. An optical communication system comprising:

a plurality of optical modulated signal generating units, each including a plurality of modulators modulating carriers having different microwave frequencies with transmission signals and outputting frequency modulated signals, adding means for generating a microwave frequency multiplexed signal by adding the frequency modulated signals, and an optical frequency modulator generating an optical frequency modulated signal by frequency modulation with said microwave frequency multiplexed signal;

optical mixing means for mixing the optical frequency modulated signals of the optical frequency modulated signal generating units, to thereby generate an optical frequency multiplexed signal, the optical frequency multiplexed signal including a signal component, in an intermediate frequency band; and an optical frequency discriminator, connected to said optical mixing means, receiving and dividing the optical frequency multiplexed signal into first and second signals, the first signal having a time delay with respect to the second signal, and mixing the first and second signals to generate an optical frequency multiplexed signal to be transmitted to a receiver.

15. An optical communication system comprising:

a plurality of optical frequency modulated signal generating units for modulating a plurality of carriers with a plurality respectively corresponding transmission signals, each carrier having a different microwave frequency and each optical frequency modulated signal generating unit including a plurality of modulators corresponding, respectively, to the plurality of carriers, each modulator modulating the corresponding carrier with the transmission signal corresponding to the respective carrier, and adding means for generating a microwave frequency multiplexed signal by adding the modulated carriers, and an optical frequency modulator generating an optical frequency modulated signal by frequency modulation with said. microwave frequency multiplexed signal;

optical mixing means for mixing the optical frequency modulated signals generated by said plurality of optical frequency modulated signal generating units, to produce a mixed signal including a signal component in an intermediate band; and an optical frequency discriminator
dividing the mixed signal into a first signal and a second signal, the first signal being delayed by a delay time with respect to the second signal, and mixing the first signal and the second signal.

16. A sending device for transmitting a signal light to a receiving device in an optical communication system, comprising:

a plurality of optical frequency modulated signal generating units for modulating a plurality of carriers with a plurality of respectively corresponding transmission signals, each carrier having a different microwave frequency and each optical frequency modulated signal generating unit including a plurality of modulators corresponding, respectively, to the plurality of carriers, each modulator modulating the corresponding carrier with the transmission signal corresponding to the respective carrier to thereby produce a modulated carrier, and a plurality of band limiting filters corresponding, respectively, to the plurality of modulators, each band limiting filter band limiting the modulated carrier produced by the corresponding modulator to thereby Produce a band limited signal, adding means for generating a microwave frequency multiplexed signal by adding the band limited signals produced by the plurality of band limiting filters, and an optical frequency modulator generating an optical frequency modulated signal by frequency modulation with said microwave frequency multiplexed signal; and optical mixing means for mixing the optical frequency modulated signals generated by said optical frequency modulators of said plurality of optical frequency modulated signal generating units, to thereby produce an optical frequency multiplexed signal to be transmitted to a receiver and including a signal component in an intermediate frequency band.

17. An optical communication system comprising:

a plurality of signal generating units, each signal generating unit modulating a plurality of carriers with a plurality of data signals, respectively, to thereby produce a plurality of modulated carrier signals, each carrier being at a different frequency, combining the plurality of modulated carrier signals to thereby produce a multiplexed signal, and modulating the multiplexed signal; and a mixer mixing together the modulated, multiplexed signals of the signal generating units, to produce a resulting signal for transmission to a receiver and which includes a signal component in an intermediate frequency band.

18. An optical communication system as claimed in claim 17, wherein each signal generating unit band limits each modulated carrier signal before the plurality of modulated carrier signals are combined to produce the multiplexed signal.

* * * * *

UNITED STATES PATENT AND TRADEMARK OFFICE
CERTIFICATE OF CORRECTION

PATENT NO. :   5,896,211
DATED       :   April 20, 1999
INVENTOR(S):   Watanabe

It is certified that error appears in the above-identified patent and that said Letters Patent is hereby corrected as shown below:

Col. 1,   line 55, "system" should be --system,--.

Col. 2,   line 10, after "oscillator" insert --4--.

Col. 4,   "Detailed Description of the Preferred Embodiments" should be underlined.

Col. 18,  line 62, after "3," insert --further--.

Col. 19,  line 4, after "detector" insert --means for converting--.

Col. 22,  line 10, "Produce" should be --produce--.

Signed and Sealed this

Thirty-first Day of August, 1999

Attest:

Q. TODD DICKINSON

*Attesting Officer*   Acting Commissioner of Patents and Trademarks